US012810756B2

(12) United States Patent
Lee et al.

(10) Patent No.: US 12,810,756 B2
(45) Date of Patent: Nov. 24, 2026

(54) ELECTRONIC DEVICE AND METHOD FOR PARTIALLY CONTROLLING BRIGHTNESS OF FLEXIBLE DISPLAY ON BASIS OF SHAPE OF FLEXIBLE DISPLAY

(71) Applicant: Samsung Electronics Co., Ltd., Suwon-si (KR)

(72) Inventors: Hyungmin Lee, Suwon-si (KR); Bonghak Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/985,756

(22) Filed: Dec. 18, 2024

(65) Prior Publication Data

US 2025/0118235 A1 Apr. 10, 2025

Related U.S. Application Data

(63) Continuation of application No. PCT/KR2023/006171, filed on May 4, 2023.

(30) Foreign Application Priority Data

Jul. 1, 2022 (KR) ........................ 10-2022-0081518
Jul. 8, 2022 (KR) ........................ 10-2022-0084669

(51) Int. Cl.
*G09G 3/00* (2006.01)

(52) U.S. Cl.
CPC ..... *G09G 3/035* (2020.08); *G09G 2320/0233* (2013.01); *G09G 2320/0686* (2013.01); *G09G 2354/00* (2013.01)

(58) Field of Classification Search
CPC ...... G06F 3/041; G06F 3/0482; G06F 3/0484; G06F 3/0488; G06F 3/04883;
(Continued)

(56) References Cited

U.S. PATENT DOCUMENTS 8,686,981 B2 4/2014 Barnhoefer et al.
9,119,261 B2 8/2015 Barnhoefer et al.
(Continued)

FOREIGN PATENT DOCUMENTS

CN 108270919 A 7/2018
CN 109471494 A 3/2019
(Continued)

OTHER PUBLICATIONS

International Search Report dated Aug. 17, 2023, issued in International Patent Application No. PCT/KR2023/006171.

*Primary Examiner* — Richard J Hong
(74) *Attorney, Agent, or Firm* — Jefferson IP Law, LLP

(57) ABSTRACT

An electronic device is provided. The electronic device includes a first housing, a second housing, a hinge structure rotatably coupling the second housing to the first housing, a flexible display disposed at the first housing and the second housing, memory storing one or more computer programs, a sensor for detecting an angle between the first housing and the second housing, and one or more processors operably coupled to the flexible display, the memory, and the sensor, wherein the one or more computer programs include computer-executable instructions that, when executed by the one or more processors individually or collectively, cause the electronic device to display a screen within a first part and a second part of the flexible display, which are separated by the hinge structure, based on an application among a plurality of applications stored in the memory, and based on detecting an angle less than a specified angle from the sensor, while a first application for playing a content within the first part among the plurality of applications is executed, adjust brightness of the second part less than brightness of the first part in which the content is being played.

16 Claims, 15 Drawing Sheets

(58) Field of Classification Search
CPC .... G06F 1/1677; G06F 1/1641; G06F 1/1652; G09G 2320/0233; G09G 2320/0686; G09G 2354/00; G09G 3/035; G09G 3/3208; H04M 1/02; H04M 1/72403; H04M 1/72454; H10K 59/40; G09F 9/301; H04N 23/53
See application file for complete search history.

(56) References Cited

U.S. PATENT DOCUMENTS

| | | | | |
|---|---|---|---|---|
| 9,864,410 | B2 | 1/2018 | La et al. | |
| 10,264,266 | B2 | 4/2019 | Pan | |
| 10,310,732 | B2 | 6/2019 | Chaudhri et al. | |
| 11,176,879 | B2 | 11/2021 | Cho | |
| 11,270,664 | B2 | 3/2022 | Jiang et al. | |
| 12,131,017 | B2 | 10/2024 | Seo et al. | |
| 2014/0282059 | A1* | 9/2014 | Oh | G06F 1/1641 715/761 |
| 2015/0153778 | A1* | 6/2015 | Jung | G06F 1/1677 345/156 |
| 2017/0169759 | A1 | 6/2017 | Jang | |
| 2019/0384362 | A1 | 12/2019 | Xing | |
| 2020/0211440 | A1 | 7/2020 | Lee et al. | |
| 2021/0166612 | A1* | 6/2021 | Lee | G09F 9/301 |
| 2022/0129041 | A1* | 4/2022 | Kim | G06F 1/1652 |
| 2022/0375388 | A1* | 11/2022 | Kim | G09G 3/035 |
| 2022/0375428 | A1* | 11/2022 | He | G06F 1/1641 |
| 2022/0386486 | A1* | 12/2022 | Fang | G06F 1/1641 |
| 2023/0034927 | A1* | 2/2023 | Chung | G06F 3/04883 |
| 2024/0430580 | A1* | 12/2024 | Kim | H04N 23/53 |

FOREIGN PATENT DOCUMENTS

| | | | | |
|---|---|---|---|---|
| CN | 109639879 | A | 4/2019 | |
| CN | 111158621 | A | 5/2020 | |
| KR | 10-1091241 | B1 | 12/2011 | |
| KR | 10-2016-0080034 | A | 7/2016 | |
| KR | 10-1943427 | B1 | 1/2019 | |
| KR | 10-2020-0083847 | A | 7/2020 | |
| KR | 10-2022-0081565 | A | 6/2022 | |
| WO | WO-2021098790 | A1 * | 5/2021 | G09G 3/3208 |

* cited by examiner

ELECTRONIC DEVICE AND METHOD FOR PARTIALLY CONTROLLING BRIGHTNESS OF FLEXIBLE DISPLAY ON BASIS OF SHAPE OF FLEXIBLE DISPLAY

CROSS-REFERENCE TO RELATED APPLICATION(S)

This application is a continuation application, claiming priority under § 365 (c), of an International application No. PCT/KR2023/006171, filed on May 4, 2023, which is based on and claims the benefit of a Korean patent application number 10-2022-0081518, filed on Jul. 1, 2022, in the Korean Intellectual Property Office, and of a Korean patent application number 10-2022-0084669, filed on Jul. 8, 2022, in the Korean Intellectual Property Office, the disclosure of each of which is incorporated by reference herein in its entirety.

BACKGROUND

1. Field

The disclosure relates to an electronic device and a method for partially controlling brightness of a flexible display on the basis of a shape of the flexible display.

2. Description of Related Art

Recently, spread of various types of portable electronic devices such as a smartphone, a tablet personal computer (PC), a wireless earphone, and a smart watch is expanding. Some of the portable electronic devices may include a flexible display that is deformable. A portable electronic device including the flexible display may provide a folding state (e.g., fully folding), an unfolding state (e.g., fully unfolding), and an intermediate state between the folding state and the unfolding state, through the flexible display.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device and method for partially controlling brightness of flexible display on basis of shape of flexible display.

Additional aspects will be set forth in part in the description which follows and, in part, will be apparent from the description, or may be learned by practice of the presented embodiments.

In accordance with an aspect of the disclosure, an electronic device is provided. The electronic device includes a first housing, a second housing, a hinge structure rotatably coupling the second housing to the first housing, a flexible display disposed at the first housing and the second housing, memory storing one or more computer programs, a sensor for detecting an angle between the first housing and the second housing, and one or more processors operably coupled to the flexible display, the memory, and the sensor, wherein the one or more computer programs include computer-executable instructions that, when executed by the one or more processors individually or collectively, cause the electronic device to display a screen within a first part and a second part of the flexible display, which are separated by the hinge structure, based on an application among a plurality of applications stored in the memory, and based on detecting the angle less than a specified angle from the sensor, while a first application for playing content within the first part among the plurality of applications is executed, adjust brightness of the second part less than brightness of the first part in which the content is being played.

In accordance with another aspect of the disclosure, a method performed by an electronic device is provided. The method includes identifying an angle by using a sensor, while displaying a screen using all of a first part of a flexible display disposed on a surface of a first housing, and a second part of the flexible display disposed on a surface of a second housing, based on identifying a specified angle indicating a state that a direction of the first part and a direction of the second part are parallel each other, controlling the first part and the second part based on first brightness by using the sensor, based on identifying another angle less than the specified angle, obtaining an image from a camera by using the sensor, within a first state in which all of a first body part and a second body part included in the first body part are identified in the image, controlling the second part based on second brightness greater than the first brightness, independently of the first part controlled based on the first brightness, within a second state in which the first body part is identified independently of the second body part in the image, controlling the first part and the second part based on the first brightness, and within a third state different from the first state and the second state, controlling the first part based on the second brightness, independently of the second part controlled based on the first brightness.

In accordance with another aspect of the disclosure, a method performed by an electronic device is provided. The method includes identifying an angle by using a sensor, while displaying a screen using all of a first part of a flexible display disposed on a surface of a first housing, and a second part of the flexible display disposed on a surface of a second housing, based on identifying a specified angle indicating a state that a direction of the first part and a direction of the second part are parallel each other, controlling the first part and the second part based on first brightness by using the sensor, based on identifying another angle less than the specified angle, obtaining an image from a camera by using the sensor, and, based on whether a specified body part is identified within the image, and whether content included in the screen is selectively displayed within a part of the first part or the second part, adjusting brightness of the part of the first part or the second part to second brightness different from the first brightness.

In accordance with another aspect of the disclosure, one or more non-transitory computer-readable storage media storing one or more computer programs including computer-executable instructions that, when executed by one or more processors of an electronic device individually or collectively, cause the electronic device to perform operations are provided. The operations include identifying an angle by using a sensor, while displaying a screen using all of a first part of a flexible display disposed on a surface of a first housing, and a second part of the flexible display disposed on a surface of a second housing, based on identifying a specified angle indicating a state that a direction of the first part and a direction of the second part are parallel each other, controlling the first part and the second part based on first brightness by using the sensor, based on identifying another angle less than the specified angle, obtaining an image from a camera by using the sensor, within a first state in which all of a first body part and a second body part included in the first body part are identified in the image, controlling the second part based on second brightness greater than the first brightness, independently of the first part controlled based on the first brightness, within a second state in which the first body part is identified independently of the second body part in the image, controlling the first part and the second part based on the first brightness; and within a third state different from the first state and the second state, controlling the first part based on the second brightness, independently of the second part controlled based on the first brightness.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a microprocessor unit (MPU), a system on chip (SoC), an IC, or the like.

Figure 1:
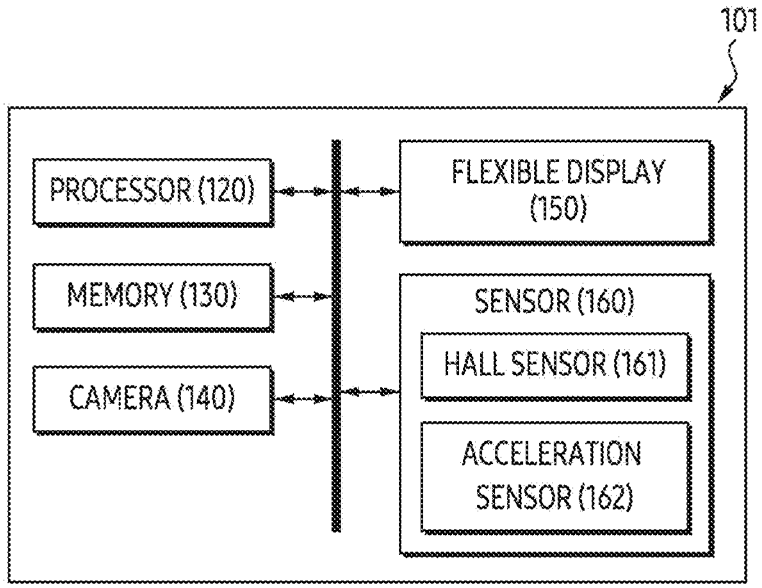
FIG. 1 illustrates an example of a block diagram of an electronic device according to an embodiment of the disclosure.

FIG. 1 illustrates an example of a block diagram of an electronic device according to an embodiment of the disclosure.

Referring to FIG. 1, an electronic device 101 according to an embodiment may include at least one of a processor 120, memory 130, a camera 140, a flexible display 150, or a sensor 160. The processor 120, the memory 130, the camera 140, the flexible display 150, and the sensor 160 may be electronically and/or operably coupled with each other by an electronical component, such as a communication bus. A type and/or the number of hardware components included in the electronic device 101 is not limited as illustrated in FIG. 1. For example, the electronic device 101 may include only some of the hardware components illustrated in FIG. 1.

The processor 120 of the electronic device 101 according to an embodiment may include a hardware component for processing data based on one or more instructions. The hardware components for processing data may include, for example, an arithmetic and logic unit (ALU), a field programmable gate array (FPGA), and/or a central processing unit (CPU). The number of the processors 120 may be one or more. For example, the processor 120 may have a structure of a multi-core processor, such as a dual core, a quad core, or a hexa core.

The memory 130 of the electronic device 101 according to an embodiment may include a hardware component for storing data and/or instructions inputted and/or outputted to the processor 120. The memory 130 may include, for example, volatile memory such as random-access memory (RAM) and/or non-volatile memory such as read-only memory (ROM). The volatile memory may include, for example, at least one of dynamic RAM (DRAM), static RAM (SRAM), cache RAM, and pseudo SRAM (PSRAM). The non-volatile memory may include, for example, at least one of programmable ROM (PROM), erasable PROM (EPROM), electrically erasable PROM (EEPROM), flash memory, a hard disk, a compact disk, and an embedded multimedia card (eMMC).

In the memory 130 of the electronic device 101 according to an embodiment, one or more instructions indicating an operation to be performed by the processor 120 on data may be stored. A set of instructions may be referred to as firmware, an operating system, a process, a routine, a sub-routine and/or an application. For example, the electronic device 101 and/or the processor 120 of the electronic device 101 may perform at least one of operations of FIGS. 11 to 13 by executing a set of a plurality of instructions distributed in a form of an application.

At least a part of the camera 140 of the electronic device 101 according to an embodiment may be disposed by overlapping at least a part of the flexible display 150. The camera 140 according to an embodiment may be disposed under an opening formed between pixels of the flexible display 150. The camera 140 may receive light through the opening. The camera 140 disposed under the opening may be referred to as a hole camera.

The camera 140 according to an embodiment may be disposed on the flexible display 150 by overlapping. For example, the camera 140 may be disposed on a different surface from a surface at which the flexible display 150 is disposed. The camera 140 may include one or more optical sensors (e.g., a charged coupled device (CCD) sensor and a complementary metal oxide semiconductor (CMOS) sensor) generating an electric signal indicating a color and/or brightness of light. A plurality of optical sensors included in the camera 140 may be disposed in a form of a 2-dimensional array. The camera 140 may generate an image that corresponds to light reached to the optical sensors of the 2-dimensional array and includes a plurality of pixels arranged in 2 dimensions, by obtaining an electric signal of each of the plurality of optical sensors substantially simultaneously. For example, photo data captured by using the camera 140 may mean an image obtained from the camera 140. For example, the electronic device 101 may identify a body part such as a face or an eyeball within the image obtained from the camera 140. An operation of adjusting brightness of a part of the flexible display 150 by using the identified body part by the electronic device 101 will be described later in FIG. 7.

Figure 2A:
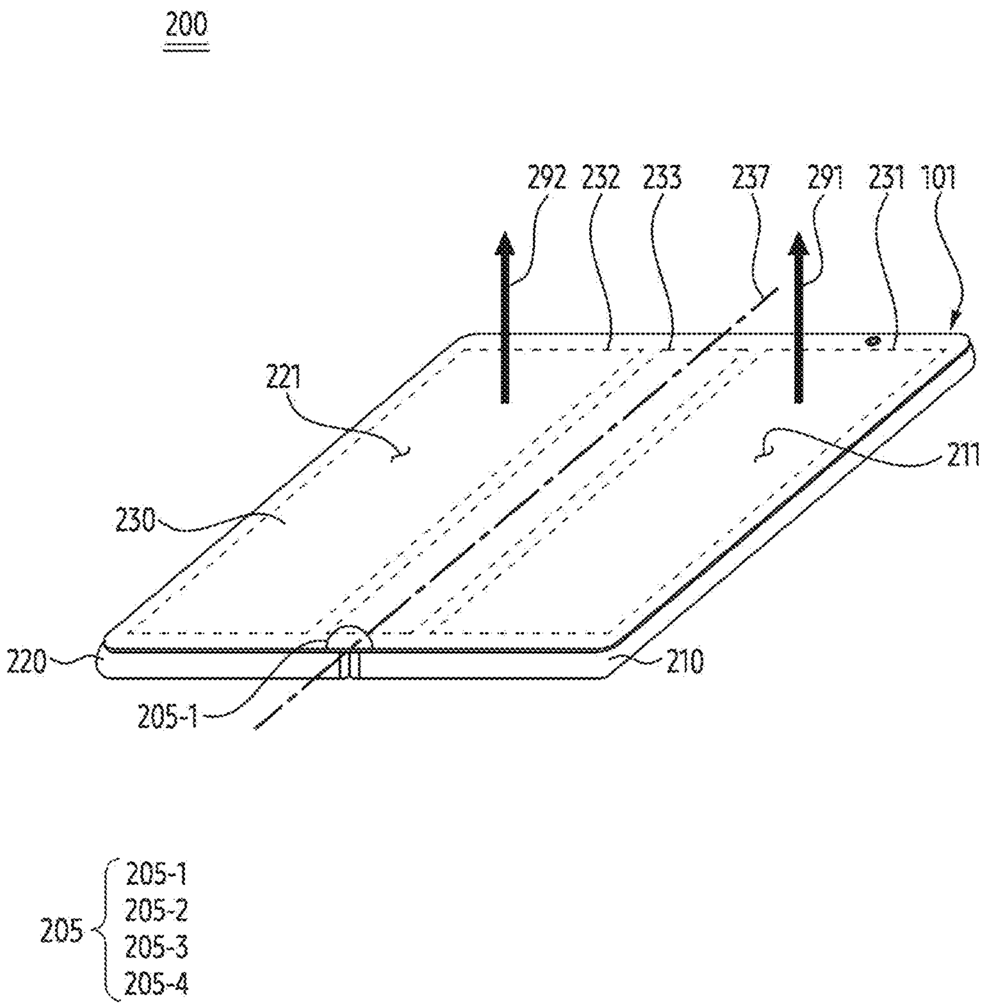
FIGS. 2A and 2B illustrate an example of a positional relationship between a first housing and a second housing in an unfolding state and a folding state of an electronic device according to various embodiments of the disclosure.
Figure 2B:
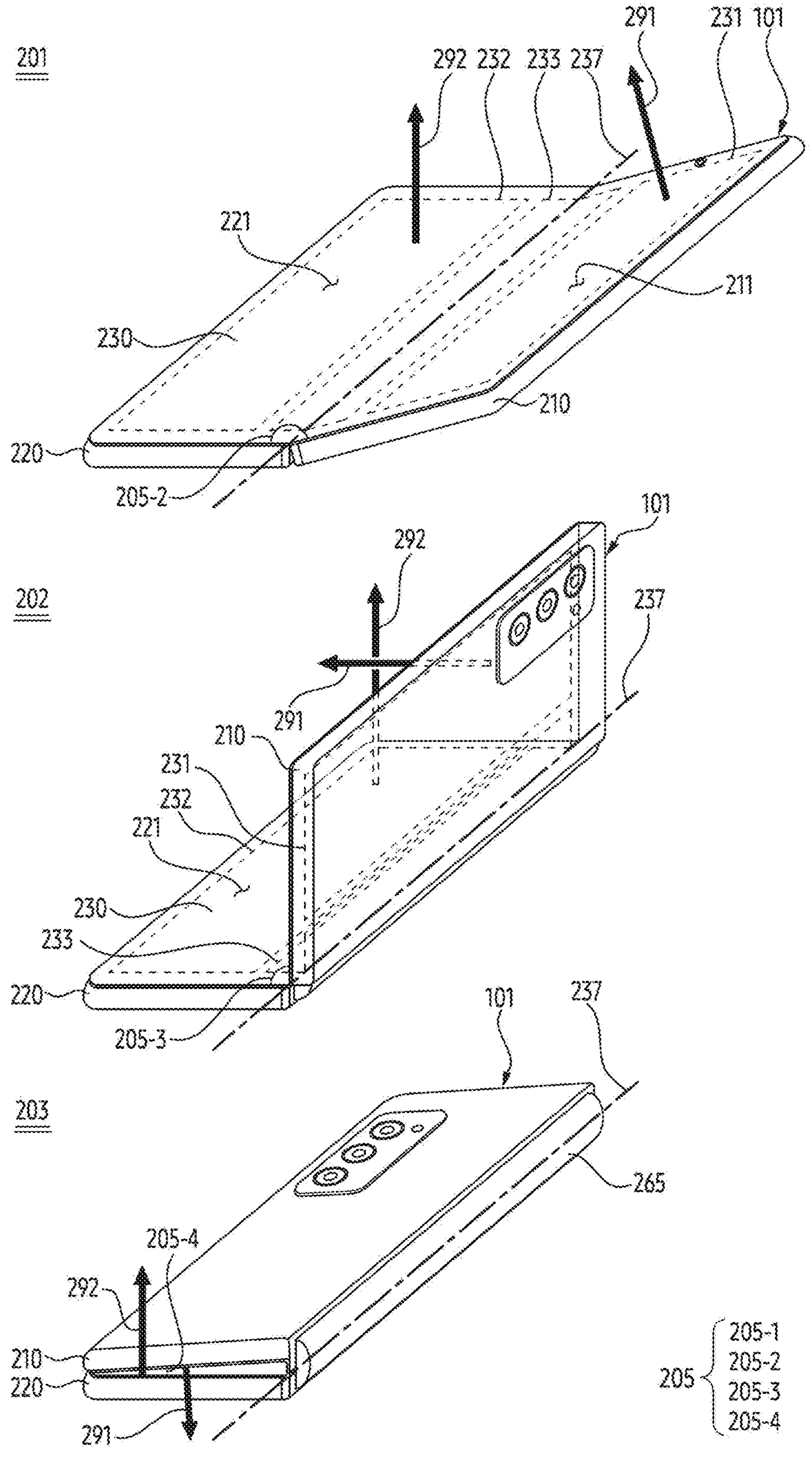

The flexible display 150 according to an embodiment may output visualized information to a user by being controlled by a controller such as the processor 120. The flexible display 150 may include a flat panel display (FPD) and/or electronic paper. The FPD may include a liquid crystal display (LCD), a plasma display panel (PDP), and/or one or more light emitting diodes (LEDs). The LED may include an organic LED (OLED). In FIGS. 2A and 2B, a positional relationship between a first housing and a second housing of the electronic device 101 including the deformable flexible display 150 will be described later. For example, the flexible display 150 may be used to display an image obtained by the processor 120 or an image obtained by a display driving circuit. For example, the electronic device 101 may display the image on a part of the flexible display 150 under control of the display driving circuit. For example, the electronic device 101 may display an image obtained by using the camera 140 through the flexible display 150. However, it is not limited thereto.

The flexible display 150 according to an embodiment may include at least one of a cover panel (C-panel) for protecting the flexible display 150, a base substrate, a thin film transistors (TFT) layer formed on the base substrate, a pixel layer (or an organic light emitting layer) including pixels emitted based on voltage applied from the thin film transistors layer, or a polarization layer disposed on the pixel layer.

The electronic device 101 including the flexible display 150 according to an embodiment may partially change the brightness of the flexible display 150, based on the brightness of the flexible display 150 perceived by the user, based on an angle between the flexible display 150 and the user's gaze.

The electronic device 101 according to an embodiment may adjust the brightness of a part of the flexible display 150 by using the sensor 160 and/or the camera 140. For example, the electronic device 101 may identify an angle between the first housing and the second housing by using the sensor 160. The electronic device 101 may adjust the brightness of the flexible display 150 based on the identified angle. For example, the electronic device 101 may identify at least one body part in the obtained image by using the camera 140. The electronic device 101 may change the brightness of the flexible display 150 based on the identified body part. For example, the electronic device 101 may change the brightness of the flexible display 150 based on one of a plurality of applications stored in the memory 130. An operation in which the electronic device 101 adjusts the brightness of the flexible display 150 based on an application will be described later in FIGS. 3 and 4.

The sensor 160 of the electronic device 101 according to an embodiment may generate electronic information capable of being processed by the processor 120 and/or the memory 130 from non-electronic information related to the electronic device 101. The electronic information generated by the sensor 160 may be stored in the memory 130, or processed by the processor 120, and/or transmitted to another electronic device distinguished from the electronic device 101. An embodiment of the electronic device 101 is not limited to a type and/or the number of one or more sensors illustrated in FIG. 1. For example, the sensor 160 may include Global Positioning System (GPS) sensor for detecting a geographic location of the electronic device 101 and an illuminance sensor measuring brightness of ambient light.

The sensor 160 of the electronic device 101 according to an embodiment may detect a state (e.g., a folding state or an unfolding state) of the electronic device 101 or an external environmental state. The electronic device 101 may generate an electric signal or a data value corresponding to the detected state from the sensor 160. For example, the sensor 160 may include at least one hall sensor 161 and at least one acceleration sensor 162.

The hall sensor 161 according to an embodiment may include one or more magnets and/or one or more magnetic sensors. At least one of the one or more magnets or the one or more magnetic sensors included in the hall sensor 161 may be disposed in different positions within the electronic device 101. A positional relationship of the one or more magnets and/or the one or more magnetic sensors in the electronic device 101 may be changed according to a shape of the electronic device 101. The electronic device 101 may measure a change of the positional relationship through the one or more magnetic sensors. The change of the positional relationship may cause a change of a magnetic field formed by the one or more magnets. The electronic device 101 may obtain a power signal indicating the change of the magnetic field by using the hall sensor 161. For example, the electronic device 101 may distinguish a posture or a state (e.g., the folding state or the unfolding state) by using the power signal obtained from the hall sensor 161. For example, the electronic device 101 may receive data indicating the state of the electronic device 101 from the hall sensor 161. For example, the hall sensor 161 may output data indicating the shape of the flexible display 150. The shape of the flexible display 150 may be changed as it is folded or unfolded by a folding axis (e.g., a folding axis 237 of FIG. 2A). For example, the hall sensor 161 may output different data indicating the shape of the flexible display 150. For example, the electronic device 101 may identify the brightness of the flexible display 150 corresponding to any one of states 710, 720, and 730 of FIG. 7 based on data outputted from the hall sensor 161. For example, the electronic device 101 may adjust the brightness of a part of the flexible display 150 by using data stored in the memory 130. For example, the brightness of the adjusted part of the flexible display 150 and the brightness of a part different from the adjusted part may be different. For example, the posture or the shape of the electronic device 101 may be measured by using the acceleration sensor 162.

The sensor 160 of the electronic device 101 according to an embodiment may include the acceleration sensor 162 for measuring a physical movement of the electronic device 101. For example, the acceleration sensor 162 may output electronic information indicating magnitude of acceleration of gravity measured in each of a plurality of specified axes (e.g., x-axis, y-axis, and z-axis) perpendicular to each other. For example, the processor 120 of the electronic device 101 may measure a posture of the electronic device 101 in a physical space based on the electronic information outputted from the acceleration sensor 162. The posture measured by the electronic device 101 may indicate an orientation of the electronic device 101 and/or a shape of the electronic device 101 (e.g., a shape of the electronic device 101 deformed by an external force to be described later in FIGS. 2A and 2B) that are measured by the acceleration sensor 162. The electronic device 101 may determine a mode of the electronic device 101 based on the measured posture. For example, the electronic device 101 may identify a mode corresponding to a posture of the electronic device 101 from among specified modes including a landscape mode and a portrait mode as a plurality of specified modes. For example, in case that a housing and/or the flexible display 150 of the electronic device 101 has a width and a length, the landscape mode may include a state in which an angle between a direction of the acceleration of the gravity measured by the acceleration sensor 162 and a length direction of the electronic device 101 is included within a specified range including a right angle. The portrait mode may include a state in which an angle between the direction of the acceleration of the gravity measured by the acceleration sensor 162 and a width direction of the electronic device 101 is included within the specified range including the right angle. According to an embodiment, the plurality of specified modes are other modes distinguished from the landscape mode and the portrait mode described above, and may further include, for example, a mode related to the shape of the electronic device 101 deformed by the external force. For example, the electronic device 101 may measure electronic information indicating the shape of the electronic device 101 by using another sensor (e.g., the hall sensor 161) distinguished from the acceleration sensor 162. For example, the electronic device 101 may identify a location where at least one screen is displayed on the flexible display 150, based on a posture of the electronic device 101 by using the acceleration sensor 162.

Although not illustrated, the electronic device 101 according to an embodiment may further include a plurality of sensors. For example, the electronic device 101 may include a geomagnetic sensor. For example, the geomagnetic sensor may output electronic information indicating magnitude of magnetic field measured on each of the plurality of specified axes (e.g., x-axis, y-axis, and z-axis) perpendicular to each other. For example, the electronic device 101 may obtain information on a direction of the electronic device 101 by using the geomagnetic sensor. The electronic device 101 according to an embodiment may include a gyro sensor. For example, the gyro sensor may output electronic information indicating a movement and/or rotation of the electronic device 101. The electronic device 101 may obtain information indicating positions of housings of the electronic device 101 by using the gyro sensor.

The electronic device 101 according to an embodiment may operate based on a state (e.g., the folding state or the unfolding state) by using the sensor 160 including the hall sensor 161 and/or the acceleration sensor 162. For example, the electronic device 101 may change a location and a size of a screen (e.g., user interface (UI)) outputted on the flexible display 150 based on the state. For example, the electronic device 101 may play a video within a part of the flexible display 150 divided by a folding axis (e.g., the folding axis 237 of FIG. 2A). The electronic device 101 may display a screen including information different from the video within a part different from the part. For example, the electronic device 101 may decrease brightness (or luminance) of the screen outputted on the different part. In FIGS. 2A and 2B, a state of the electronic device 101 according to a positional relationship between the first housing and the second housing will be described later.

FIGS. 2A and 2B illustrate an example of a positional relationship between a first housing and a second housing in an unfolding state and a folding state of an electronic device according to various embodiments of the disclosure.

An electronic device 101 may be referred to the electronic device 101 of FIG. 1. A flexible display 230 may be referred to the flexible display 150 of FIG. 1. A first housing 210, a second housing 220, and a folding housing 265 may be included in the electronic device 101. At least a part of the flexible display 230 may be disposed on a surface (e.g., a first surface 211) of the first housing 210 and a surface (e.g., a second surface 221) of the second housing. A first display area 231, a second display area 232, and a third display area 233 may be included in the flexible display 230. The folding housing 265 may include a hinge structure.

The electronic device 101 according to an embodiment may provide an unfolding state in which the first housing 210 and the second housing 220 are fully folded out by the folding housing 265. For example, referring to FIG. 2A, the electronic device 101 may be in an unfolded state 200 that is the unfolding state. For example, the unfolded state 200 may mean a state in which a first direction 291 in which the first surface 211 faces corresponds to a second direction 292 in which the second surface 221 faces. For example, in the unfolded state 200, the first direction 291 may be parallel to the second direction 292. For example, in the unfolded state 200, the first direction 291 may be the same as the second direction 292.

The first surface 211 according to an embodiment may form a substantially single plane with the second surface 221 in the unfolded state 200. For example, an angle 205-1 between the first surface 211 and the second surface 221 in the unfolded state 200 may be 180 degrees. For example, the unfolded state 200 may mean a state capable of providing all of entire display area of the flexible display 230 on the substantially single plane. For example, the unfolded state 200 may mean a state capable of providing all of the first display area 231, the second display area 232, and the third display area 233 on the plane. For example, in the unfolded state 200, the third display area 233 may not include a curved surface. For example, the unfolding state may be referred to as an unfolded state (an outspread state or an outspreading state). For example, the electronic device 101 may control brightness of the flexible display 230, based on the same brightness in the unfolding state. In a state different from the unfolding state, the electronic device 101 may adjust brightness of a part of the flexible display 230 based on an angle 205. Hereinafter, different states of the electronic device 101 based on angles 205-2, 205-3, and 205-4 will be described later.

Referring to FIG. 2B, the electronic device 101 according to an embodiment may provide a folding state in which the first housing 210 and the second housing 220 are folded in by the folding housing 265. For example, the electronic device 101 may be in the folding state including a first folding state 201, a second folding state 202, and a third folding state 203. For example, the folding state including the first folding state 201, the second folding state 202, and the third folding state 203 may mean a state in which the first direction 291 in which the first surface 211 faces is distinguished from the second direction 292 in which the second surface 221 faces. For example, in the first folding state 201, an angle between the first direction 291 and the second direction 292 is 45 degrees, and the first direction 291 and the second direction 292 may be distinguished from each other. For example, in the second folding state 202, the angle between the first direction 291 and the second direction 292 is 90 degrees, and the first direction 291 and the second direction 292 may be distinguished from each other. For example, in the third folding state 203, the angle between the first direction 291 and the second direction 292 is substantially 180 degrees, and the first direction 291 and the second direction 292 may be distinguished from each other.

An angle between the first surface 211 and the second surface 221 in the folding state according to an embodiment may be greater than or equal to 0 degrees, and less than 180 degrees. For example, in the first folding state 201, the angle 205-2 between the first surface 211 and the second surface 221 may be 135 degrees. In the second folding state 202, the angle 205-3 between the first surface 211 and the second surface 221 may be 90 degrees. In the third folding state 203, the angle 205-4 between the first surface 211 and the second surface 221 may be substantially 0 degrees. For example, the folding state may be referred to as a folded state.

In an embodiment, unlike the unfolding state, the folding state may include a plurality of sub-folding states. For example, referring to FIG. 2B, the folding state may include as a plurality of the sub-folding states including the third folding state 203 in which the first surface 211 is in a fully folding state overlapping substantially on the second surface 221 by rotation provided though the folding housing 265, the state 201 that is an intermediate state between the third folding state 203 and the unfolding state (e.g., the unfolded state 200 of FIG. 2A), and the state 202. For example, as the first surface 211 and the second surface 221 face each other by the folding housing 265, the electronic device 101 may provide the third folding state 203 in which an entire area of the first display area 231 overlaps substantially completely on an entire area of the second display area 232. For example, the electronic device 101 may provide the third folding state 203 in which the first direction 291 is substantially opposite to the second direction 292. For example, the third folding state 203 may mean a state in which the flexible display 230 is covered within a user's field of view looking at the electronic device 101. However, it is not limited thereto.

The flexible display 230 according to an embodiment may be bent by the rotation provided through the folding housing 265. For example, in the flexible display 230, unlike the first display area 231 and the second display area 232, the third display area 233 may be bent according to a folding operation. For example, the third display area 233 may be in a state of being bent curvedly to prevent damage to the flexible display 230 within the fully folding state. In the fully folding state, unlike the third display area 233 being bent curvedly, the entire first display area 231 may completely overlap on the entire second display area 232.

Referring to FIGS. 2A and 2B, an example in which the flexible display 230 of the electronic device 101 includes a folding display area (e.g., the third display area 233) or the electronic device 101 includes a folding housing (e.g., the folding housing 265) is illustrated, but this is for convenience of explanation. According to embodiments, the flexible display 230 of the electronic device 101 may include a plurality of folding display areas. For example, the flexible display 230 of the electronic device 101 may include two or more folding display areas, and the electronic device 101 may include two or more folding housings to provide the two or more folding areas respectively.

The electronic device 101 according to an embodiment may display a screen by using all of the first display area 231, the second display area 232, and the third display area 233 of the flexible display 230, based on one of a plurality of applications stored in the memory (e.g., the memory 130 of FIG. 1) in the unfolded state 200. For example, the screen may include a plurality of content. For example, the plurality of content may include a video. For example, the electronic device 101 may control all of the display areas 231, 232, and 233 of the flexible display 230, based on the same brightness. For example, the electronic device 101 may identify one of different states 201 and 202 from the unfolded state 200 by using a sensor (e.g., the sensor 160 of FIG. 1). The electronic device 101 may change a location of some of the plurality of content, displayed on the flexible display 230, based on identifying one of the different states 201 and 202. For example, the electronic device 101 may display the video on a part of the first display area 231 and the third display area 233. The electronic device 101 may display information different from the video included in the plurality of content in a part different from a part of the second display area 232 and the third display area 233. For example, the electronic device 101 may adjust brightness of one of the display areas 231, 232, and 233, based on identifying one of the different states 201 and 202. The electronic device 101 according to an embodiment may adjust brightness of a part of the flexible display 230 based on a folding axis 237. An operation of adjusting brightness by the electronic device 101 based on an application will be described later in FIGS. 3 and 4.

Figure 3:
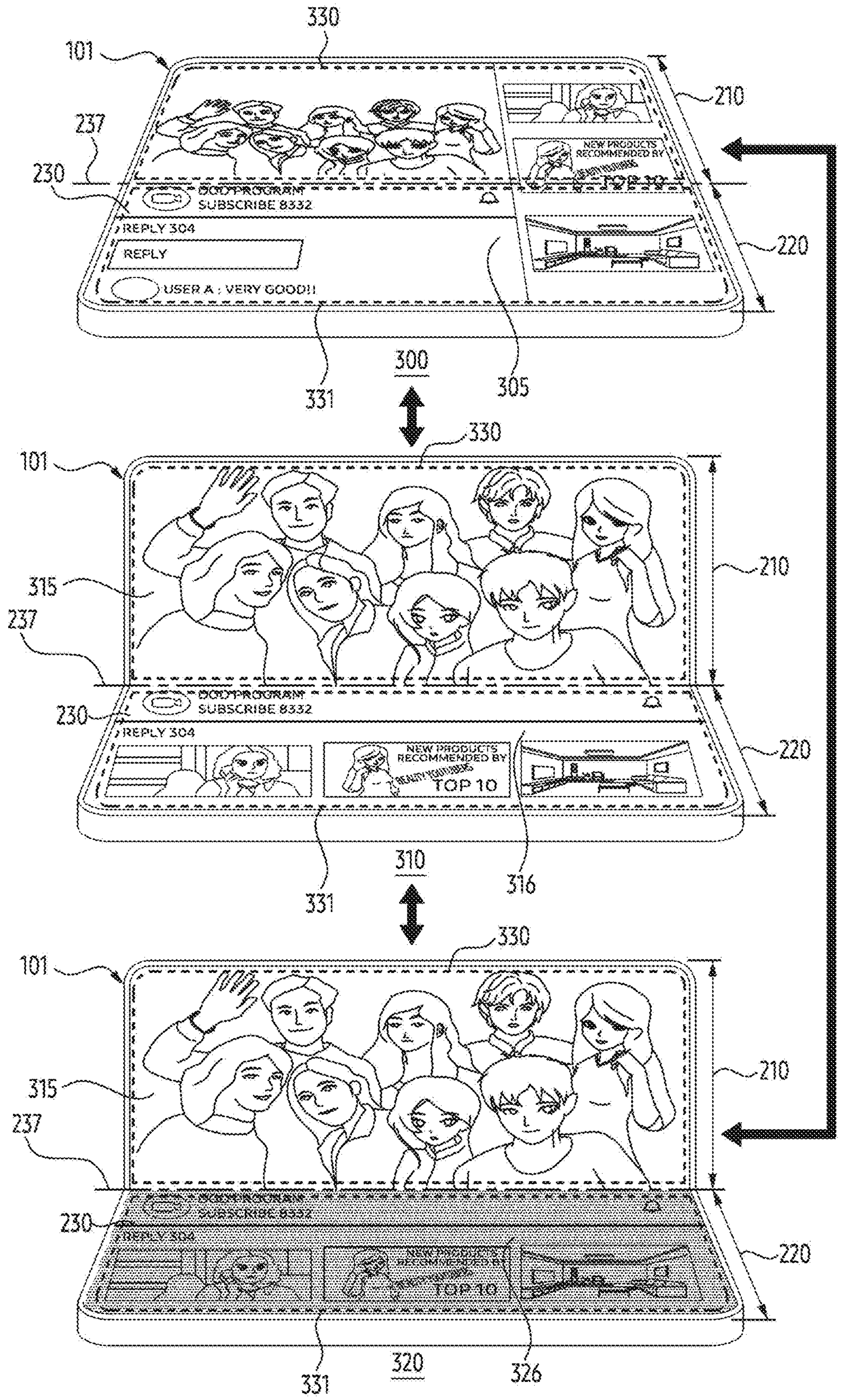
FIG. 3 illustrates an example of an operation in which an electronic device adjusts brightness of a flexible display based on an application according to an embodiment of the disclosure.

FIG. 3 illustrates an example of an operation in which an electronic device adjusts brightness of a flexible display based on an application according to an embodiment of the disclosure.

An electronic device 101 may be referred to the electronic device 101 of FIG. 1. A first housing 210 may be referred to the first housing 210 of FIG. 2A. A second housing 220 may be referred to the second housing 220 of FIG. 2A. A first part 330 may be a display area of a flexible display (e.g., the flexible display 230 of FIG. 2A) disposed on a surface (e.g., the first surface 211 of FIG. 2A) of the first housing 210. The first part 330 may be a part of the flexible display 230, which is divided by a folding axis 237. A second part 331 may be a part different from the part of the flexible display 230. The first part 330 may include a part of the first display area 231 of FIG. 2A and the third display area 233 of FIG. 2A with respect to the folding axis. The second part 331 may include a part different from the part of the second display area 232 of FIG. 2A and the third display area 233 of FIG. 2A. An unfolded state 300 may be referred to the unfolded state 200 of FIG. 2A. A second folding state 310 and a third folding state 320 may be referred to one of the second folding state 202 of FIG. 2A or the third folding state 203 of FIG. 2A. The unfolded state 300 may be an unfolding state. The second and third folding states 310 and 320 may be an example of a folding state or a sub-folding state.

Referring to FIG. 3, the electronic device 101 according to an embodiment may display a screen 305 by using all of the first part 330 and the second part 331, based on one of a plurality of applications stored in memory (e.g., the memory 130 of FIG. 1) in the unfolded state 300. For example, the electronic device 101 may control brightness of the first part 330 and the second part 331, based on the same brightness. For example, the application may be an example of an application playing a video. For example, the screen 305 may include a video and information different from the video. The different information may include a first list of videos different from the video. The electronic device 101 may receive an input indicating selection of a video from the first list. In response to the reception, the electronic device 101 may display or play a video different from the video on the screen 305. For example, in response to the reception, the electronic device 101 may display a screen including the different video and a second list different from the first list. The electronic device 101 may identify the state 310 by using at least one sensor (e.g., the sensor 160 of FIG. 1). The electronic device 101 may change a location of a plurality of content included in the screen 305 based on identifying the state 310.

The electronic device 101 according to an embodiment may display a video 315 on the first part 330 in the state 310. For example, the electronic device 101 may display a screen 316 on the second part 331 in the state 310. For example, the electronic device 101 may display the video 315 on the second part 331 by using at least one sensor (e.g., the acceleration sensor 162 of FIG. 1). For example, the electronic device 101 may obtain a plurality of values by using the at least one sensor. The electronic device 101 may identify a housing parallel to the ground by using the plurality of obtained values. The electronic device 101 may display the screen 316 in a part (e.g., the first part 330 or the second part 331) included in the identified housing. An operation in which the electronic device 101 obtains the plurality of values by using the at least one sensor will be described later in FIGS. 5A and 5B.

While displaying the video 315 on the second part 331, the electronic device 101 may display the screen 316 on the first part 330. For example, the video 315 may include a video among a plurality of content included in the screen 305. The video 315 may be an example of a video in which one of a size or a position of the video included in the screen 305 is changed. For example, the screen 316 may include information different from that of the video 315. For example, the different information may include a list of videos different from the video 315.

For example, the electronic device 101 may display the screen 316 on the second part 331 while playing the video 315 on the first part 330. For example, while playing the video, the brightness of the first part 330 may be changed, based on one of the frames included in the video. For example, a part of the changed brightness of the first part 330 may be less than the brightness of the second part 331. For example, based on the brightness of the second part 331, the screen displayed in the second part 331 may cause reflection on the first part 330. For example, while displaying the video 315 in the first part 330, the electronic device 101 may adjust the brightness of the second part 331, based on second brightness, which is less than first brightness of the first part 330. For example, the electronic device 101 may display a screen 326 in the second part 331 while playing the video 315 on the first part 330, independently of adjusting the brightness of the second part 331.

The electronic device 101 according to an embodiment may display the screen 326 by overlapping the screen 316 in the second part 331 while displaying the video 315 on the first part 330 in the state 320. For example, the screen 326 may be an example of a screen set to be displayed on the second part 331 while a processor 120 of electronic device 101 plays the video 315. For example, the screen 326 may be an example of "dim layer". The screen 326 may be an example of a black screen and/or an opaque screen. The electronic device 101 may overlap and display a screen 326 having a specified alpha value (e.g., an alpha value indicating opacity) on the screen 316. For example, in case that an Android operating system (OS) is stored in the memory, the electronic device 101 may determine whether to display the screen 326 by using a parameter such as "WindowManager-.LayoutParams". For example, the electronic device 101 may adjust at least one of a size or a position of the screen 326. For example, although not illustrated, the electronic device 101 may display the screen 326 on the second part 331 by overlapping a part of the screen 316. For example, the electronic device 101 may display the screen 326 on the second part 331 after a specified time while playing the video on the first part 330.

The electronic device 101 according to an embodiment may receive an input through the second part 331. For example, the electronic device 101 may cease to display the screen 326 based on receiving the input. For example, the electronic device 101 may deactivate the display of the screen 326 for a specified time in response to receiving the input. A state in which the electronic device 101 ceases to display the screen 326 may be substantially the same as the state 310. In the state 310, in case of not receiving an input different from the input for the specified time, the electronic device 101 may display the screen 326 on the second part 331 by overlapping the screen 316.

The electronic device 101 according to an embodiment may deactivate a part of the plurality of pixels included in the second part 331 independently of displaying the screen 326 on the second part 331 by overlapping, while playing the video on the first part 330 in the state 320. The electronic device 101 according to an embodiment may receive an input through the second part 331. For example, based on receiving the input, the electronic device 101 may activate the part of the deactivated plurality of pixels.

Although not illustrated, the electronic device 101 according to an embodiment may receive an input through the first part 330 while playing a video in the first part 330. Based on the received input, the electronic device 101 may display one of a screen or content for ceasing to play the video.

For example, the electronic device 101 may adjust the brightness of the first part 330 and/or the second part 331, based on an application different from the application for playing a video stored in the memory. For example, in case of adjusting the brightness of the second part 331, the electronic device 101 may adjust the brightness of the second part 331 to be greater than or equal to the brightness of the first part 330. An operation of adjusting the brightness by the electronic device 101 based on the different application will be described later in FIG. 4.

As described above, based on an application for playing a video, the electronic device 101 according to an embodiment may reinforce visibility of a user of the electronic device 101, based on adjusting the brightness of the second part 331 while playing a video in the first part 330 of the flexible display in the sub-folding state. The visibility may be improved as a relative difference between lightness (or brightness) of the first part 330 and the second part 331 increases. In order to maximize the difference, the electronic device 101 may display the black screen (or the opaque screen) in the second part 331 while playing the video.

Figure 4:
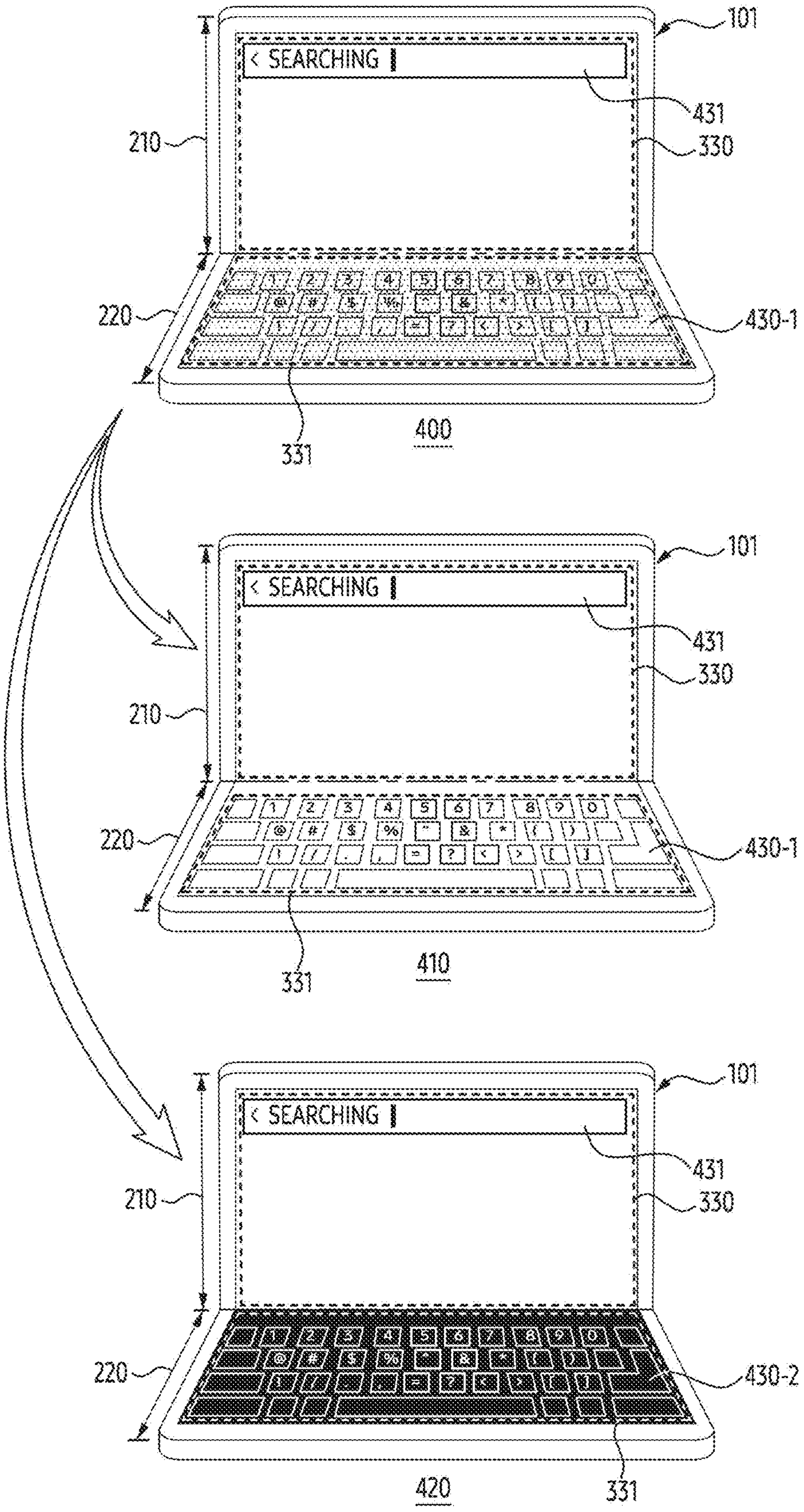
FIG. 4 illustrates an example of an operation in which an electronic device adjusts brightness of a flexible display, based on an angle between a first housing and a second housing according to an embodiment of the disclosure.

FIG. 4 illustrates an example of an operation in which an electronic device adjusts brightness of a flexible display, based on an angle between a first housing and a second housing according to an embodiment of the disclosure.

Referring to FIG. 4, states 400, 410 and 420 may be referred to the states 201 and 202 of FIG. 2B. An electronic device 101 may be referred to the electronic device 101 of FIG. 1. A first housing 210 may be referred to the first housing 210 of FIG. 2A. A second housing 220 may be referred to the second housing 220 of FIG. 2A. A first part 330 may be referred to the first part 330 of FIG. 3. A second part 331 may be referred to the second part 331 of FIG. 3.

The electronic device 101 according to an embodiment may display a virtual keypad 430-1 in a part of a flexible display (e.g., the flexible display 150 of FIG. 1), based on one of a plurality of applications stored in memory (the memory 130 of FIG. 1). The application may be an example of an application requesting to display a virtual keypad to a processor (e.g., the processor 120 of FIG. 1) of the electronic device 101. The electronic device 101 may identify a folding state by using a sensor (e.g., the sensor 160 of FIG. 1). In the identified folding state (e.g., the state 400), the electronic device 101 may display a screen 431 in the first part 330 while displaying the virtual keypad 430-1 in the second part 331. The screen 431 may include a text input part. The text input part may be linked with the virtual keypad 430-1. For example, the text input part may include text identified based on an input received through the virtual keypad 430-1. For example, the electronic device 101 may receive an input through the second part 331 by using the virtual keypad 430-1. The electronic device 101 may display text on the screen 431 based on the received input. For example, the electronic device 101 may change a position of a part where the screen 431 and the virtual keypad 430-1 are displayed by using at least one sensor (e.g., the acceleration sensor 162 of FIG. 1). For example, although not illustrated, the electronic device 101 may display the screen 431 in the second part 331 while displaying the virtual keypad 430-1 in the first part 330. For example, brightness of the first part 330 may look relatively brighter than brightness of the second part 331, based on a user's viewing angle looking at the electronic device 101. For example, the electronic device 101 may adjust the brightness of the second part 331 to compensate for a relative brightness of the second part 331.

In the state 410, the electronic device 101 according to an embodiment may adjust the brightness of the second part 331 in which the virtual keypad 430-1 is displayed to brightness greater than the brightness of the first part 330. Based on the adjusted brightness of the second part 331, the brightness of the first part 330 and the second part 331 may be seen substantially the same to the user of the electronic device 101. For example, the electronic device 101 may adjust the brightness of the first part 330 and/or the second part 331 based on the viewing angle. The electronic device 101 may identify the viewing angle based on at least one of the body parts of the user of the electronic device by using a camera (e.g., the camera 140 of FIG. 1). Based on the identified viewing angle, the electronic device 101 may change the brightness of the first part 330 and/or the second part 331. An operation in which the electronic device 101 identifies the user's body part by using the camera will be described later in FIG. 7.

The electronic device 101 according to an embodiment may adjust the brightness of the first part 330 and/or the second part 331 based on an angle between the first housing 210 and the second housing 220. The electronic device 101 may identify the brightness of the second part 331 by using data stored in the memory based on the angle. An operation in which the electronic device 101 identifies brightness by using the data based on the angle will be described later in FIG. 8. For example, the electronic device 101 may adjust lightness of a screen displayed on the second part 331 independently of adjusting the brightness of the second part 331.

In the state 420, the electronic device 101 according to an embodiment may display a virtual keypad 430-2 having a color different from a color of the virtual keypad 430-1 in the second part 331. For example, the virtual keypad 430-2 may include an inverted color of the color of the virtual keypad 430-1. For example, the electronic device 101 may adjust lightness of the virtual keypad 430-1. For example, the electronic device 101 may identify a viewing angle by using the sensor or the camera. The electronic device 101 may adjust the lightness based on the viewing angle and/or the angle between the first housing 210 and the second housing 220. However, it is not limited to the above-described embodiment.

As described above, the electronic device 101 according to an embodiment may display the virtual keypad 430-1 in the second part 331, based on an application stored in the memory. The electronic device 101 may adjust the brightness of the second part 331 to the brightness greater than the brightness of the first part 330 to compensate for visibility of the virtual keypad 430-1. The electronic device 101 may display the virtual keypad 430-1 in the second part 331 by replacing with the virtual keypad 430-2. The user of the electronic device 101 may secure visibility to the second part 331, based on the adjusted brightness of the second part 331 and/or the virtual keypad 430-2 with respect to the first part 330.

Figure 5A:
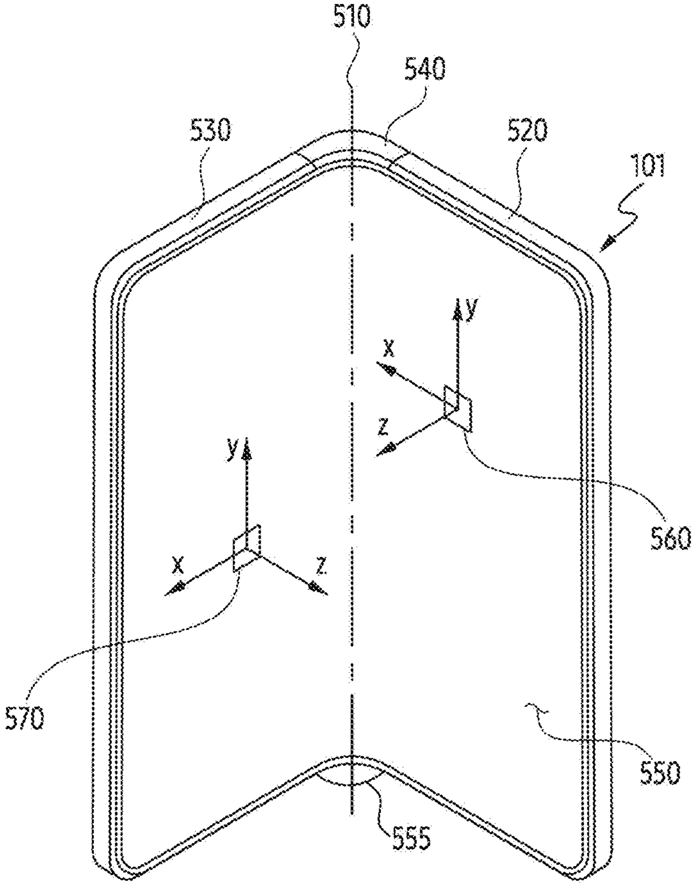
FIGS. 5A and 5B illustrate an example of position of a plurality of acceleration sensors within an electronic device according to various embodiments of the disclosure.
Figure 5B:
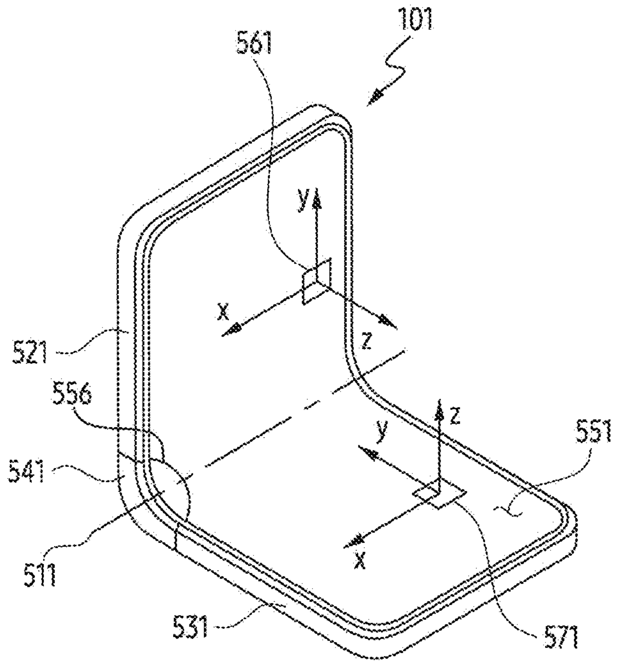

FIGS. 5A and 5B illustrate an example of positions of a plurality of acceleration sensors within an electronic device according to various embodiments of the disclosure.

An electronic device 101 of FIG. 5A and an electronic device 101 of FIG. 5B may be an example of the electronic device 101 of FIG. 1 having a different shape. Referring to FIGS. 5A and 5B, examples of an electronic device divided by a shape and/or a structure of a housing are illustrated. The electronic device of FIGS. 5A and 5B may be a terminal that is owned by different users. For example, the electronic device 101 may include a deformable housing (e.g., the first housing 210 of FIG. 2A, the second housing 220 of FIG. 2A, and the folding housing 265 of FIG. 2A), based on at least one folding axis. Acceleration sensors 560, 561, 570, and 571 may be referred to the acceleration sensor 162 of FIG. 1. First housings 520 and 521 may be referred to the first housing 210 of FIG. 2A. Second housings 530 and 531 may be referred to the second housing 220 of FIG. 2A. Folding housings 540 and 541 may be referred to the folding housing 265 of FIG. 2A. Folding axes 510 and 511 may be referred to the folding axis 237 of FIG. 2A. Flexible displays 550 and 551 may be referred to the flexible display 230 of FIG. 2A.

Referring to FIG. 5A, the deformable housing of the electronic device 101 according to an embodiment may be distinguished by the folding housing 540 including the folding axis 510, and the first housing 520 and the second housing 530 connected to the folding housing 540. The flexible display 550 of the electronic device 101 according to an embodiment may be an example of a display disposed across the first housing 520 and the second housing 530.

The electronic device 101 according to an embodiment may include the acceleration sensors 560 and 570 disposed in each of the first housing 520 and the second housing 530. The acceleration sensors 560 and 570 may be included in the electronic device 101 to measure a shape and/or a posture of the electronic device 101. Each of the acceleration sensors 560 and 570 may be included in a six-axis motion sensor including an acceleration sensor based on three axes of a +x-axis, a +y-axis, and a +z-axis of FIG. 5A, and a gyro sensor based on the three axes. The acceleration sensors 560 and 570 may identify acceleration applied to each of the three axes. The acceleration may be a vector based on a direction and/or magnitude of a net force applied to the electronic device 101. For example, the acceleration may be a vector indicating an amount of a change in speed of the electronic device 101 by the net force. The net force applied to the electronic device 101 may include a combination of gravity or another force (e.g., a force applied to the electronic device 101 by a user holding the electronic device 101) distinguished from the gravity. The acceleration sensors 560 and 570 of the electronic device 101 according to an embodiment may identify rotation of an acceleration sensor based on the one or more axes. The electronic device 101 according to an embodiment may identify a movement of the electronic device 101, based on the acceleration and/or the rotation identified by each of the acceleration sensors 560 and 570.

The electronic device 101 according to an embodiment may identify an angle 555 between the first housing 520 and the second housing 530 by using the acceleration sensors 560 and 570. The electronic device 101 may identify a state of the electronic device 101 (e.g., a folding state, an unfolding state, or a sub-unfolding state) based on the angle 555. For example, in a state that the second housing 530 is fixed, the electronic device 101 may obtain values of the three axes of the +x-axis, the +y-axis, and the +z-axis of FIG. 5A, by using the acceleration sensor 560 included in the first housing 530. The shape of the device 101 according to an embodiment is not limited to an embodiment of FIG. 5A in which the folding axis 510 is formed parallel to a length among a width and the length shorter than the width of the flexible display 550.

Referring to FIG. 5B, an example of the electronic device 101 including the flexible display 551 having a width and a length longer that the width, and the folding axis 511 formed parallel to the width. A deformable housing of the electronic device 101 may include the folding housing 541 including the folding axis 511, and the first housing 521 and the second housing 531 distinguished by the folding axis 511. The electronic device 101 may include the acceleration sensors 561 and 571 disposed in each of the first housing 521 and the second housing 531. The electronic device 101 may obtain an angle 556 between the first housing 521, the second housing 531, and the folding axis 511 by using the acceleration sensors 561 and 571. The electronic device 101 may identify the state of the electronic device 101 based on the angle 556.

In an embodiment, the acceleration sensors 561 and 571 included in the electronic device 101 may be disposed on printed circuit boards (PCBs) included in each of the first hosing 521 and the second housings 531. A PCB on which a processor (e.g., the processor 120 of FIG. 1) is disposed among the PCBs may be referred to as a main board. Another PCB different from the PCB that is the main board among the PCBs may be referred to as a sub-board. An acceleration sensor disposed on the main board may be referred to as a main acceleration sensor (e.g., a main 6-axis acceleration sensor), and another acceleration sensor may be referred to as a sub-acceleration sensor (e.g., a sub-6 axis acceleration sensor), from among the acceleration sensors 561 and 571.

As described above, the electronic device 101 according to an embodiment may include a plurality of acceleration sensors for identifying a shape and/or a posture of a deformable housing. Acceleration measured by the acceleration sensors 560, 561, 570, and 571 disposed in the deformable housings 520, 521, 530, 531, 540, and 541 in the electronic device 101 according to an embodiment may be different from each other. For example, as parts in which the acceleration sensors are disposed may move or rotate differently according to a type of the electronic device 101, the acceleration measured by the acceleration sensors may be different. The electronic device 101 may identify the state of the electronic device (e.g., the folding state, the sub-folding state, or the unfolding state) based on the measured acceleration. The electronic device 101 may adjust brightness of the flexible displays 550 and 551 by using the measured acceleration. For example, while the electronic device 101 obtains the same viewing angle by using a camera, based on the state, brightness of a part (e.g., the second part 331 of FIG. 3) of the flexible display 550 disposed in the second housing 530 may be changed to brightness greater than brightness of a part (e.g., the first part 330 of FIG. 3) different from the part disposed in the first housing 520. For example, the electronic device 101 may improve visibility based on changing the brightness of the part. Hereinafter, an operation in which an electronic device according to an embodiment adjusts brightness of a first part and/or a second part based on an application, will be described in FIG. 6 later.

Figure 6:
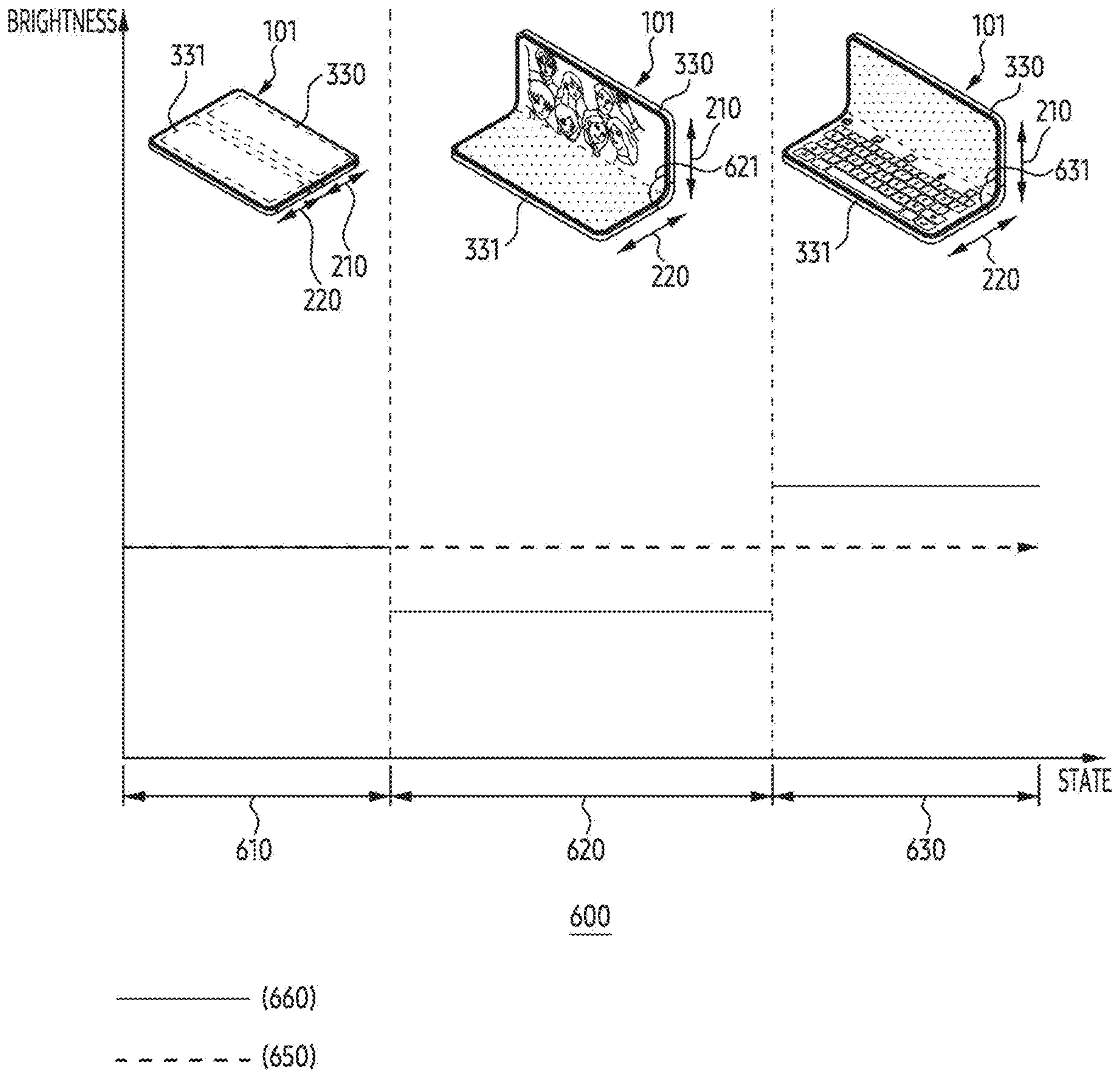
FIG. 6 illustrates an example of a graph illustrating a change in brightness of a flexible display based on an angle of a first housing and a second housing of an electronic device according to an embodiment of the disclosure.

FIG. 6 illustrates an example of a graph illustrating a change in brightness of a flexible display based on an angle of a first housing and a second housing of an electronic device according to an embodiment of the disclosure.

An electronic device 101 may be referred to the electronic device 101 of FIG. 1. A first housing 210 may be referred to the first housing 210 of FIG. 2A. A second housing 220 may be referred to the second housing 220 of FIG. 2A. A first part 330 may be referred to the first part 330 of FIG. 3. A second part 331 may be referred to the second part 331 of FIG. 3.

Referring to FIG. 6, a graph 600 indicating brightness of the first part 330 and the second part 331, based on an angle (e.g., an angle 621, or an angle 631) between the first housing 210 and the second housing 220 of the electronic device 101 according to an embodiment is illustrated. Brightness 650 and 660 may be brightness of each of the first part 330 and the second part 331 in a flexible display (e.g., the flexible display 150 of FIG. 1) of the electronic device 101. For example, the brightness 650 may be an average of brightness of pixels included in the first part 330. For example, the brightness 660 may be an average of brightness of pixels included in the second part 331.

In an unfolded state 610 according to an embodiment, the electronic device 101 may be in a state having a shape based on an unfolding state. In folding states 620 and 630, the state of the electronic device 101 may be a state in which the angle between the first housing 210 and the second housing 220 is included in a specified range in a sub-folding state. For example, the angles 621 and 631 may be greater than or equal to 90 degrees and less than 180 degrees. When a user of the electronic device 101 according to an embodiment looks at a curved flexible display, brightness of different parts (e.g., the first part 330 and the second part 331) of the curved flexible display may be recognized differently. For example, the angles 621 and 631 may be referred to a viewing angle of the user looking at the electronic device 101. For example, the viewing angle may mean an angle viewed without a distortion (or deterioration) when the user looks at the flexible display.

In the unfolded state 610 according to an embodiment, the brightness 650 of the first part 330 and the brightness 660 of the second part 331 of the electronic device 101 may be the same. For example, the electronic device 101 may adjust the first part 330 and the second part 331 based on the same brightness, in the unfolded state 610. For example, the electronic device 101 may maintain the brightness of the first part 330 and the second part 331 in the unfolded state 610. For example, the electronic device 101 may identify a position change of the first housing 210 and/or a folding state of the electronic device 101 by using at least one sensor (e.g., the sensor 160 of FIG. 1).

The electronic device 101 according to an embodiment may display a video (e.g., the video 315 of FIG. 3) in the flexible display, based on a first application among a plurality of applications stored in memory, in the unfolded state 610. The first application may be an example of an application for playing a video. In the state 620, the electronic device 101 may display, for example, a video in the first part 330 based on identifying the angle 621. While displaying the video, the electronic device 101 may display a screen (e.g., the screen 316 of FIG. 3) including information different from the video, in the second part 331. For example, the electronic device 101 may decrease the brightness 660 of the second part 331 while displaying the screen. For example, the electronic device 101 may adjust the brightness 660 of the second part 331 to be less than or equal to the brightness 650 of the first part 330. For example, the electronic device 101 may display a black screen and/or an opaque screen (e.g., the screen 326 of FIG. 3) in the second part 331 by overlapping. For example, the electronic device 101 may deactivate some of a plurality of pixels included in the second part 331.

In the unfolded state 610 according to an embodiment, the electronic device 101 may display a virtual keypad (e.g., the virtual keypad 430-1) in the flexible display, based on a second application among the plurality of applications. For example, the second application may be an example of an application for displaying the virtual keypad. For example, the second application may be an example of applications excluding the application for playing a video among the plurality of applications stored in the memory. For example, the electronic device 101 may display the virtual keypad in the second part 331 in the state 630, based on the angle 631. For example, the electronic device 101 may increase the brightness 660 of the second part 331. For example, the electronic device 101 may adjust the brightness 660 of the second part 331 to brightness greater than the brightness 650 of the first part 330. For example, the electronic device 101 may increase intensity of the brightness 660. For example, the electronic device 101 may adjust the intensity of the brightness 660 to be greater than or equal to intensity of the brightness 650.

As described above, the electronic device 101 may adjust the brightness of the first part 330 and/or the second part 331, based on the angle between the first housing 210 and the second housing 220 and/or the application stored in the memory. The electronic device 101 may provide improved readability with respect to the first part 330 and/or the second part 331, based on the adjusted brightness. The electronic device 101 may provide user convenience based on adjusting the brightness of the first part 330 and/or the second part 331 of the flexible display according to an application used by the user.

Figure 7:
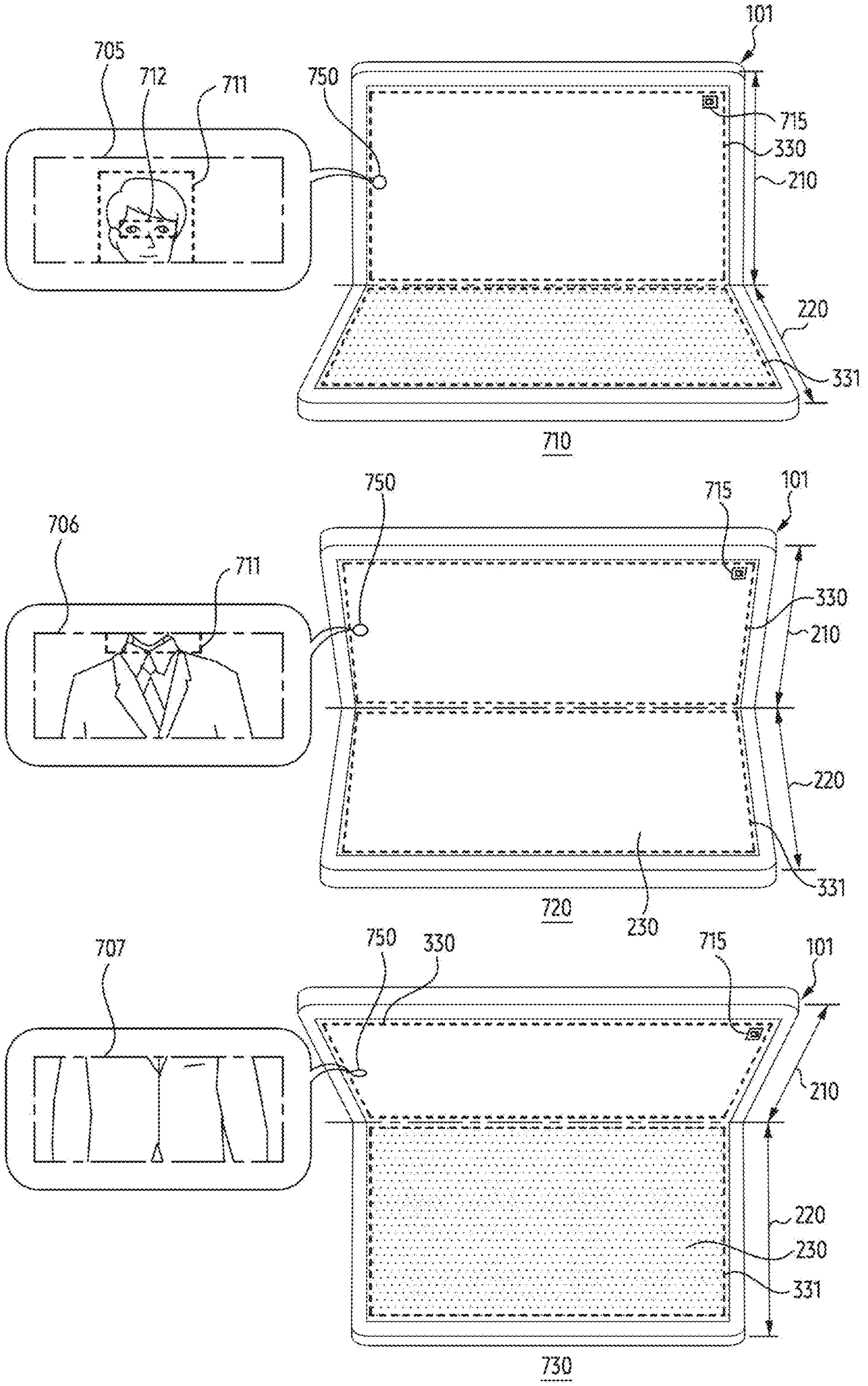
FIG. 7 illustrates an example of an operation in which an electronic device adjust brightness of a flexible display by using a camera according to an embodiment of the disclosure.

FIG. 7 illustrates an example of an operation in which an electronic device adjust brightness of a flexible display by using a camera according to an embodiment of the disclosure.

An electronic device 101 may be referred to the electronic device 101 of FIG. 1. States 710, 720, and 730 may include an example of an unfolding state of the electronic device 101. The states 710, 720, and 730 may be referred to one of the states 201 and 202 of FIG. 2B. A first housing 210 may be referred to the first housing 210 of FIG. 2A. A second housing 220 may be referred to the second housing 220 of FIG. 2A. A first part 330 may be referred to the first part 330 of FIG. 3. A second part 331 may be referred to the second part 331 of FIG. 3. A camera 750 may be referred to the camera 140 of FIG. 1. The first part 330 may include an opening for exposing at least a part of the camera 750. A flexible display 230 may be referred to the flexible display 230 of FIG. 2A.

Referring to FIG. 7, in the states 710, 720, and 730, the electronic device 101 according to an embodiment may identify a face and/or eyes by using a face recognition application programming interface (API) and/or an eye recognition API that are stored in memory (e.g., the memory 130 of FIG. 1) in an image obtained by using the camera 750. For example, using the face recognition API, the electronic device 101 may identify a face by identifying an outline of the face. The electronic device 101 may identify a landmark (e.g., eyes, nose, or mouth) included in the identified face. For example, the electronic device 101 may obtain each of viewing angles with respect to the first part 330 and the second part 331, based on the user's body part obtained by using the camera 750. The electronic device 101 may adjust brightness of the first part 330 and/or the second part 331 based on the viewing angle.

Referring to FIG. 7, in the state 710, the electronic device 101 may obtain an image 705 by using the camera 750, based on at least one application stored in the memory. For example, the application used by the electronic device 101 in the states 710, 720, and 730 may be an example of a background application. For example, while executing an application different from the application, the electronic device 101 may not display an image (e.g., images 705, 706, and 707) obtained by using the application in the flexible display 230. For example, the electronic device 101 may display an active state of the camera 750 while not displaying the images 705, 706, and 707 based on the application. For example, the electronic device 101 may display the active state by using at least one pixel included in the flexible display 230. For example, the electronic device 101 may display an icon 715 for displaying the active state on a part of the flexible display 230. For example, the icon 715 may be displayed with a dot. For example, the electronic device 101 may adjust the brightness of the first part 330 and/or the second part 331 while not displaying the image.

In the state 710, the electronic device 101 according to an embodiment may obtain the image 705 by using the camera 750. For example, in the state 710, the electronic device 101 may identify a first body part 711 (e.g., face) and a second body part 712 (e.g., eyes) of the user in the image 705. For example, in case that the electronic device 101 identifies the first body part 711 and the second body part 712 in the image 705, the brightness of the second part 331 may be adjusted to brightness greater than the brightness of the first part 330.

In the state 720, the electronic device 101 according to an embodiment may identify a part of the first body part 711 of the user in the image 706 obtained by using the camera 750. For example, the electronic device 101 may identify the part of the first body part 711 in the image 706. The electronic device 101 may maintain the brightness of the first part 330 and the brightness of the second part 331 based on the image 706. For example, the electronic device 101 may control the brightness of the first part 330 and the brightness of the second part 331 based on the same brightness.

In the state 730, the electronic device 101 according to an embodiment may identify a body part (e.g., an upper body) different from the first body part 711 and the second body part 712 in the image 707 obtained by using the camera 750. The electronic device 101 may adjust the brightness of the first part 330 to the brightness greater than the brightness of the second part 331 based on the image 707.

An operation of the electronic device 101 in the above-described states 710, 720, and 730 may be indicated as a Table 1.

TABLE 1

| Body part<br>Adjusting part | Face | Eyes |
|---|---|---|
| The second part 331 | Identification | Identification |
| — | Identification | Unidentifiable |
| The first part 330 | Unidentifiable | Unidentifiable |

Referring to the Table 1 described above, for example, in case that the electronic device 101 identifies the user's face and eyes by using the camera 750, it may maximize the brightness of the second part 331. For example, in case that the electronic device 101 identifies a part of the user's face by using the camera 750, it may control the brightness of the first part 330 and the second part 331 to be the same. For example, in case that the electronic device 101 identifies a body part different from the face and the eyes by using the camera 750, it may maximize the brightness of the first part 330. As described above, the electronic device may identify a posture and/or a position of the user facing the electronic device by using a camera. The electronic device may adjust brightness of a part of the flexible display based on the identification. The electronic device may provide convenience to a user based on the adjustment.

Figure 8:
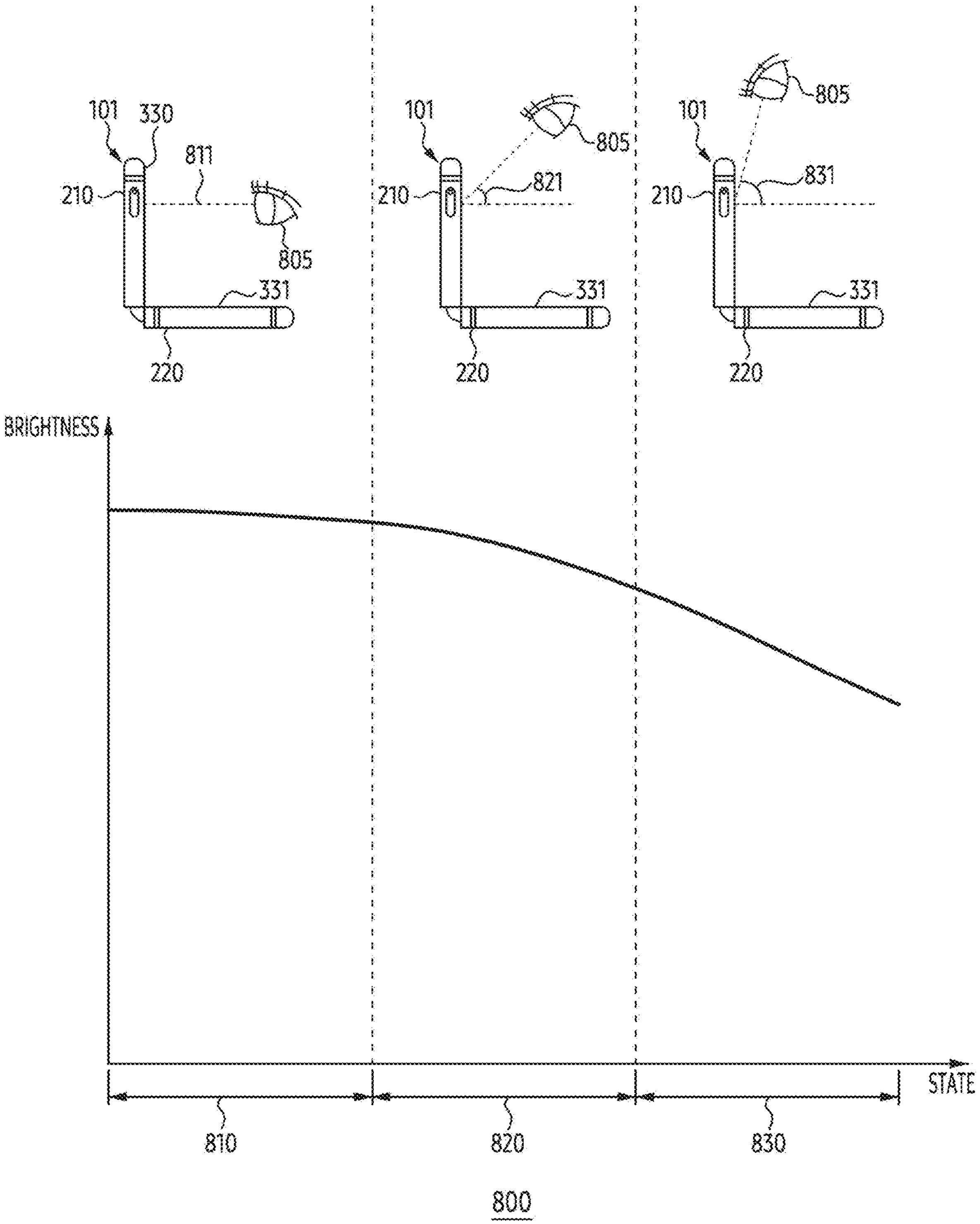
FIG. 8 illustrates an example of a graph illustrating brightness of a flexible display based on a viewing angle, according to an embodiment of the disclosure.

FIG. 8 illustrates an example of a graph illustrating brightness of a flexible display based on a viewing angle, according to an embodiment of the disclosure.

An electronic device 101 may be referred to the electronic device 101 of FIG. 1. A first housing 210 may be referred to the first housing 210 of FIG. 2A. A second housing 220 may be referred to the second housing 220 of FIG. 2A. A folding state of the electronic device 101 included in states 810, 820, and 830 may be the same as the folding state of the electronic device 101 included in the state 202 of FIG. 2B. Referring to FIG. 8, a graph 800 indicating a relative brightness change of a part (e.g., a first part 330) of the flexible display is illustrated, based on an eye 805 of a user looking at the first part 330 of the electronic device 101.

The electronic device 101 according to an embodiment may identify at least one body part (e.g., the second body part 712 of FIG. 7) of the user of the electronic device 101 in the state 810 by using at least one camera (e.g., the camera 750 of FIG. 7). The electronic device 101 may identify the eye 805 facing the first part 330 based on the identified at least one body part. The electronic device 101 may identify an angle 811 between the first part 330 and the eyes 805. The angle 811 may mean an angle of gaze with respect to a direction (e.g., a first direction 291) in which a surface (e.g., the first surface 211 of FIG. 2A) of the first housing 210 of the electronic device 101 faces. The angle 811 may be referred to a viewing angle of the user looking at the electronic device 101. The electronic device 101 may obtain brightness of the first part 330 based on the angle 811. For example, the brightness of the first part 330 may be a relative brightness identified by the user of the electronic device 101, based on an angle looking at the electronic device 101.

The electronic device 101 according to an embodiment may identify the brightness of the first part 330 based on angles 811, 821, and 831. For example, the angles 811, 821, and 831 and the brightness of the first part 330 may be in an inverse proportion relationship to each other. For example, as the angles 811, 821, and 831 increase, the brightness of the first part 330 may decrease. For example, the brightness of the first part 330 may decrease nonlinearly. For example, the electronic device 101 may identify the brightness of the first part 330 as approximately 100% in the state 810. The electronic device 101 may maintain the brightness of the first part 330 in the state 810. The electronic device 101 may control the brightness of the first part 330 and the second part 331 based on the same brightness.

The electronic device 101 according to an embodiment may obtain the brightness of the first part 330 based on the angle 821 in the state 820. For example, the electronic device 101 may identify a body part (e.g., a part of the first body part 711 of FIG. 7) different from the at least one body part by using at least one camera. The electronic device 101 may obtain the angle 821 based on the identified body part. The angle 821 may be greater than or equal to 20 degrees and less than 40 degrees. For example, the electronic device 101 may identify the brightness of the first part 330 as to be greater than or equal to approximately 85% and less than 100%, based on the angle 821. For example, the electronic device 101 may compensate for a deviation of brightness. For example, the electronic device 101 may increase an intensity of the brightness of the first part 330. An increase amount of the intensity of the brightness may be less than 15%. For example, in the state 820, the electronic device 101 may control the first part 330 based on brightness greater than the brightness of the first part 330.

In the state 830 according to an embodiment, the electronic device 101 may identify the brightness of the first part 330 based on the angle 831. For example, the electronic device 101 may identify a body part (e.g., an upper body) of body parts of the user by using at least one camera. The electronic device 101 may obtain the angle 831, based on the identified body part of the body parts of the user. The angle 831 may be greater than or equal to 40 degrees and less than or equal to 60 degrees. The electronic device 101 may identify the brightness of the first part 330 as to be greater than or equal to 65% and less than 85%. For example, the electronic device 101 may compensate for a brightness deviation (e.g., greater than or equal to 15% and less than 35%). The electronic device 101 may increase the intensity of the brightness of the first part 330 to be greater than or equal to 15% and less than 35%. For example, the electronic device 101 may adjust the brightness of the first part 330 to brightness greater than the brightness of the second part 331. The electronic device 101 may improve readability with respect to the first part 330 based on the increased brightness of the first part 330.

The electronic device 101 as described above may identify a user's body part by using at least one camera. The electronic device 101 may obtain a viewing angle based on the identified body part. The electronic device 101 may obtain the brightness of the flexible display viewed to the user by using data stored in the memory based on the viewing angle. The electronic device 101 may compensate for the brightness of the flexible display based on the obtained brightness of the flexible display. The electronic device 101 may adjust brightness of a part of the flexible display based on an angle (e.g., the viewing angle) in which the user of the electronic device 101 looks at the electronic device 101. Based on the adjusted brightness, the electronic device 101 may provide the improved readability with respect to the part of the flexible display.

Figure 9:
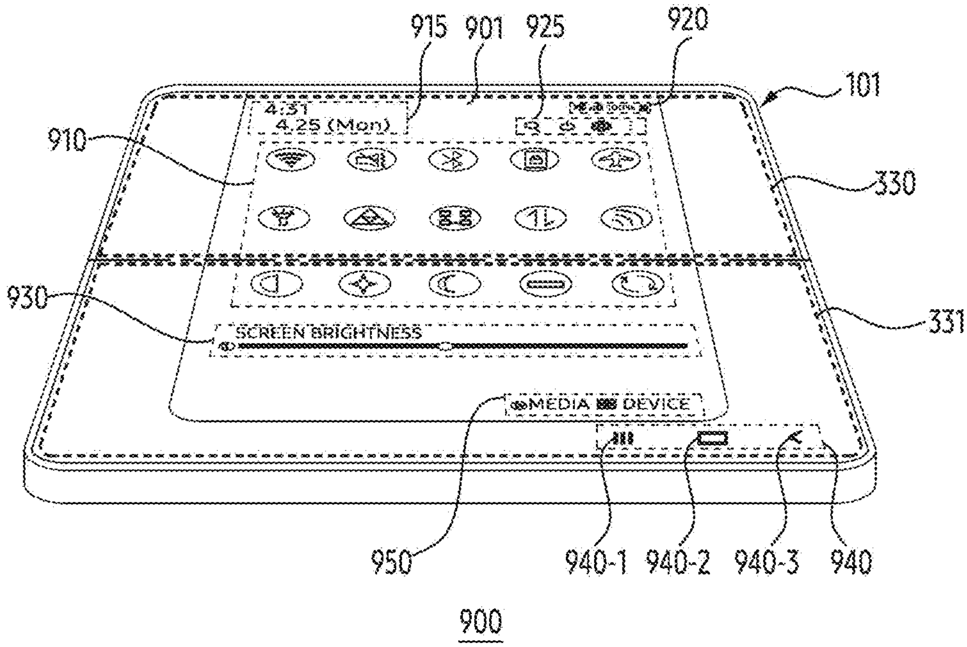
FIG. 9 illustrates an example of a visual object for adjusting brightness of a flexible display displayed by an electronic device according to an embodiment of the disclosure.
Figure 9:
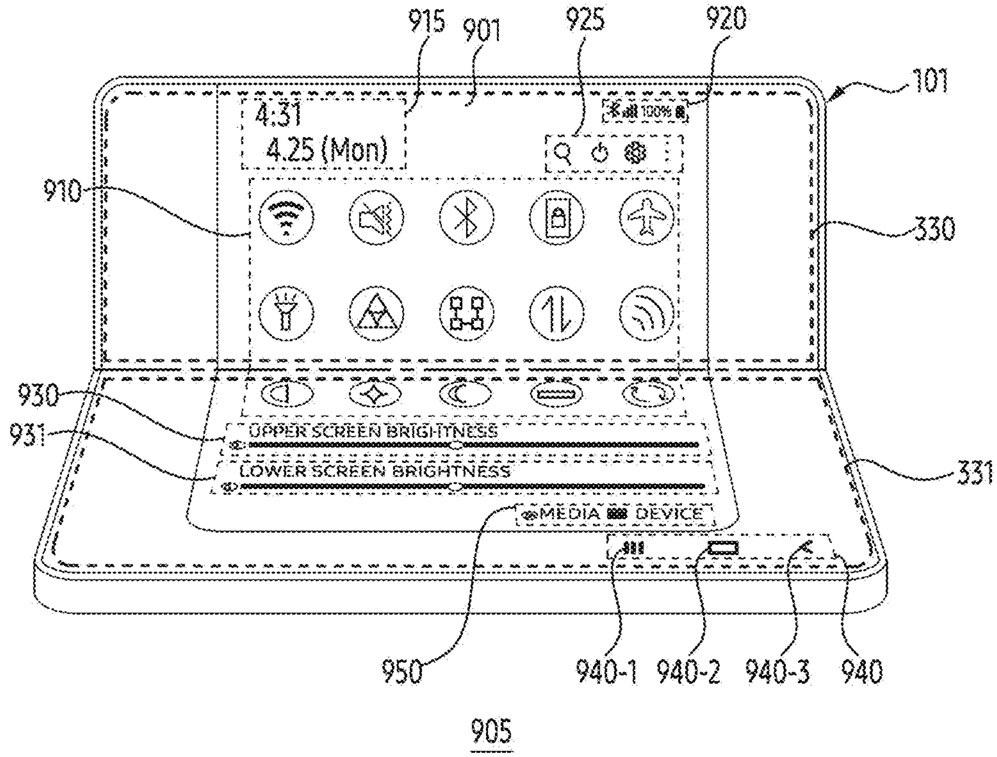

FIG. 9 illustrates an example of a visual object for adjusting brightness of a flexible display displayed by an electronic device according to an embodiment of the disclosure.

An electronic device 101 may be referred to the electronic device 101 of FIG. 1. A first part 330 may be referred to the first part 330 of FIG. 3. A second part 331 may be referred to the second part 331 of FIG. 3. An unfolded state 900 may be referred to the unfolded state 200 of FIG. 2A. The unfolded state 900 may include an unfolding state of the electronic device 101. A state 905 may be referred to the state 202 of FIG. 2B. The state 905 may include a folding state of the electronic device 101.

The electronic device 101 according to an embodiment may display a screen 901 by using all of the first part 330 and the second part 331 in the unfolded state 900. For example, the electronic device 101 may display the screen 901 based on a swipe gesture on the first part 330. For example, the swipe gesture may mean a gesture that moves from a first point of the flexible display of the electronic device 101 to a second point different from the first point. The gesture may mean a linear movement. The electronic device 101 may receive the gesture moving from an upper end to a bottom end of the first part 330 based on at least one sensor from a user. For example, the upper end and the bottom end may be changed based on a position and/or a posture of the electronic device 101. The electronic device 101 may identify the upper end part of the first part 330 based on a sensor (e.g., the acceleration sensor 162 of FIG. 1). For example, the electronic device 101 may display the screen 901 based on the received gesture.

The electronic device 101 according to an embodiment may display a plurality of icons in the screen 901. For example, the electronic device 101 may display time 915 in the screen 901. For example, the time 915 may mean time received from an external server by using communication circuitry included in the electronic device 101. For example, the time 915 may be changed in real time. For example, the electronic device 101 may display first icons 920 in the screen 901. The first icons 920 may include icons indicating whether to establish a Bluetooth low energy (BLE) connection, one of a sound mode, a vibration mode, or a silent mode of the electronic device 101, whether to establish a Wi-Fi connection, communication reception sensitivity of the electronic device 101, and/or a state (e.g., a state of charge (SOC)) of a battery. For example, the electronic device 101 may display second icons 925 on the screen 901. The electronic device 101 may receive an input for selecting one of the second icons 925. For example, based on the received input, the electronic device 101 may search for data stored in the electronic device 101, terminate the power of the electronic device 101, change settings of the electronic device 101, and/or change icons included in third icons 910.

The electronic device 101 according to an embodiment may display the third icons 910 in the screen 901. For example, the electronic device 101 may receive an input for selecting one of the third icons 910. For example, based on the received input, the electronic device 101 may perform at least one of establishing the Wi-Fi connection, changing into one of the sound mode, the vibration mode, or the silence mode of the electronic device 101, establishing a Bluetooth connection, adjusting a display of a screen based on a sensor (e.g., the acceleration sensor 162 of FIG. 1) of the electronic device 101, restricting an execution of applications stored in the electronic device 101, activating at least one LED included in the electronic device 101, adjusting usage of the battery, transmitting a power signal from the battery to an external electronic device by using a coil included in the electronic device 101, establishing a communication link (e.g., long term evolution (LTE)) by using the communication circuitry included in the electronic device, establishing a communication link different from the communication link with an external electronic device, establishing a connection with a personal computer (PC), identifying at least one code (e.g., a quick response (QR) code), adjusting one of LEDs included in the flexible display, transmitting a location of the electronic device 101 to at least one server, or transmitting a screen displayed on the flexible display to an external electronic device.

The electronic device 101 according to an embodiment may display fourth icons 950 in the screen 901. For example, the electronic device 101 may receive an input for selecting one of the fourth icons 950. For example, based on the received input, the electronic device 101 may control an external electronic device, and/or transmit music and/or video played in the electronic device 101 to the external electronic device.

The electronic device 101 according to an embodiment may display a navigation bar 940 on at least one of the first part 330 and the second part 331. For example, the navigation bar 940 may include one of a menu button 940-1, a home button 940-2, and/or a back button 940-3. For example, the electronic device 101 may provide a connection menu capable of being displayed on the flexible display by using the menu button 250-1. The connection menu may include a widget addition menu, a wallpaper change menu, a search menu, an editing menu, and/or a setting menu. For example, in case that a plurality of applications is executed, the electronic device 101 may display a tray of the plurality of applications being executed in response to an input for selecting the menu button 940-1. For example, the electronic device 101 may receive an input for selecting the home button 940-2. The electronic device 101 may display a screen based on at least one application based on the input for selecting the home button 940-2. For example, the electronic device 101 may receive an input for selecting the back button 250-3. The electronic device 101 may display a previously stacked screen of a screen displayed on the display, based on the input of selecting the back button 250-3.

The electronic device 101 according to an embodiment may display a visual object 930 for adjusting brightness of the flexible display (e.g., the flexible display 150 of FIG. 1) in the screen 901. For example, the electronic device 101 may adjust brightness of all of the first part 330 and the second part 331 by using the visual object 930. For example, the visual object 930 may be an example of sliders (or a slide bar) for adjusting brightness of the display. For example, the electronic device 101 may adjust the brightness of the first part 330 and the brightness of the second part 331 by using a sensor (e.g., an illuminance sensor). For example, the electronic device 101 may change the brightness of the first part 330 and/or the brightness of the second part 331 that are adjusted, based on an angle between the first housing 210 and the second housing 220 by using the sensor. For example, the electronic device 101 may change an icon or content included in the screen 901, based on the state (e.g., a sub-folding state or an unfolding state) of the electronic device 101.

The electronic device 101 according to an embodiment may identify the sub-folding state in the state 905 by using a sensor (e.g., the sensor 160 of FIG. 1). For example, the electronic device 101 may display a screen 902 by using the first part 330 and/or the second part 331 based on identifying the sub-folding state. The screen 902 may include a visual object 931 for adjusting the brightness of the first part 330 and/or a visual object 932 for adjusting the brightness of the second part 331. For example, the flexible display of the electronic device 101 may include a plurality of display driver ICs (DDIs). The plurality of DDIs may include a plurality of pixels. For example, the electronic device 101 may include a first DDI controlling a plurality of first pixels included in the first part 330. For example, the electronic device 101 may include a second DDI controlling a plurality of second pixels included in the second part 331. A processor (e.g., the processor 120 of FIG. 1) of the electronic device 101 may independently control each of the first DDI and the second DDI.

The electronic device 101 according to an embodiment may adjust the brightness of the first part 330 by using the visual object 931. For example, the electronic device 101 may adjust the brightness of the second part 331 by using the visual object 932. The brightness of the first part 330 and the brightness of the second part 331 that are adjusted may be different.

The electronic device 101 as described above may adjust the brightness of a part or all of the flexible display based on the screens 901 and 902. The electronic device 101 may adjust the brightness of the first part 330 and/or the second part 331 to suit a user of the electronic device 101. The electronic device 101 may compensate for the brightness of a part (e.g., the first part 330 or the second part 331) of the flexible display that is distorted (or deteriorated), based on the angle between the first housing 210 and the second housing 220, by using the visual object 931 and/or the visual object 932 included in the screen 902.

Figure 10:
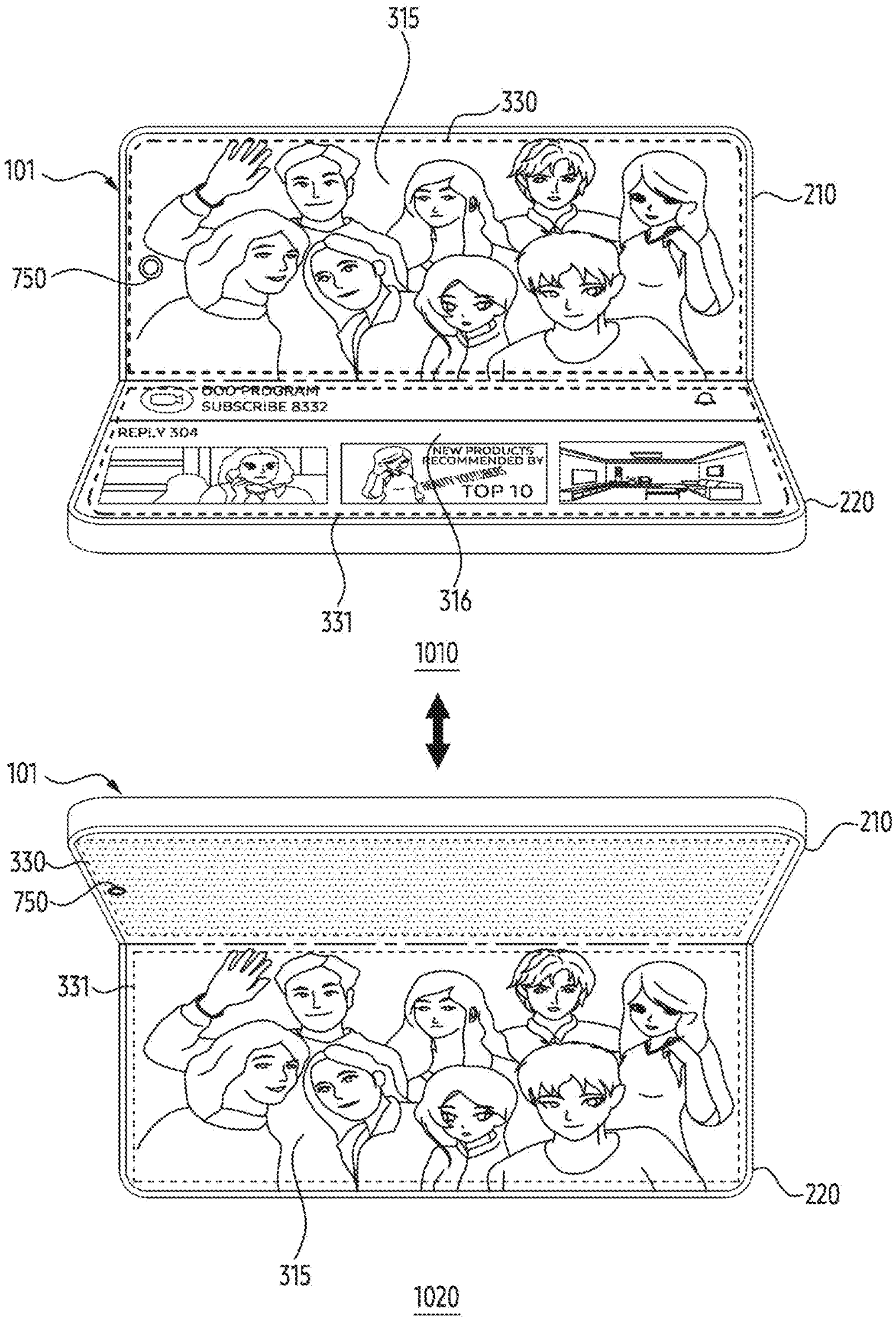
FIG. 10 illustrates an example of an operation in which an electronic device displays a screen on a part of a first part and a second part according to an embodiment of the disclosure.

FIG. 10 illustrates an example of an operation in which an electronic device displays a screen in a part of a first part and a second part according to an embodiment of the disclosure.

An electronic device 101 may be referred to the electronic device 101 of FIG. 1. A first housing 210 may be referred to the first housing 210 of FIG. 2A. A second housing 220 may be referred to the second housing 220 of FIG. 2A. A first part 330 may be referred to the first part 330 of FIG. 3. A second part 331 may be referred to the second part 331 of FIG. 3. A state 1010 may be referred to one of the states 710 and 720 of FIG. 7. A state 1020 may be referred to the state 730 of FIG. 7. A video 315 may be referred to the video 315 of FIG. 3. A screen 316 may be referred to the screen 316 of FIG. 3.

Referring to FIG. 10, the electronic device 101 according to an embodiment may display the video 315 and the screen 316 in the state 1010 by using the first part 330 and the second part 331, based on one of a plurality of applications stored in memory (e.g., the memory 130 of FIG. 1). The application may be an example of an application for playing a video. For example, the electronic device 101 may display the screen 316 on the second part 331 while playing the video 315 on the first part 330.

The electronic device 101 according to an embodiment may identify a body part of a user of the electronic device 101 based on an application different from the application. The electronic device 101 may identify the body part of the user by using a camera 750. The different applications may be an example of a background application. For example, the electronic device 101 may display the screen 316 on the second part 331 while playing the video 315 on the first part 330 in a first state (e.g., the state 710 of FIG. 7) identifying a first body part (e.g., face) and a second body part (e.g., eyes) from among the user's body parts and/or a second state (e.g., the state 720 of FIG. 7) identifying a part (e.g., a part of the face) of the first body part from among the user's body parts, by using the camera 750.

In the state 1020, the electronic device 101 according to an embodiment may display the video 315 in the second part 331. For example, the electronic device 101 may display the video 315 on the second part 331 by replacing the screen 316, in a third state (e.g., the state 730 of FIG. 7) different from the first state and the second state. For example, in the third state, the electronic device 101 may play the video 315 in the second part 331. For example, the electronic device 101 may adjust brightness of the first part 330 while playing the video. For example, the electronic device 101 may control the brightness of the first part 330 based on brightness that is less than brightness of the second part 331. For example, the electronic device 101 may deactivate some of the pixels included in the first part 330. For example, the electronic device 101 may display a black screen and/or an opaque screen on the first part 330.

As described above, the electronic device 101 may identify one of the user's body parts by using the camera 750 while playing the video on the first part 330 and/or the second part 331, based on at least one application. The electronic device 101 may identify the user's viewing angle based on one of the user's body parts. The electronic device 101 may change a part (e.g., one of the first part 330 or the second part 331) playing the video, based on the identified viewing angle. The user of the electronic device 101 may watch the video without deterioration of the brightness of the flexible display, based on a change in the part in which the video is played, independently of the user's posture or position.

Figure 11:
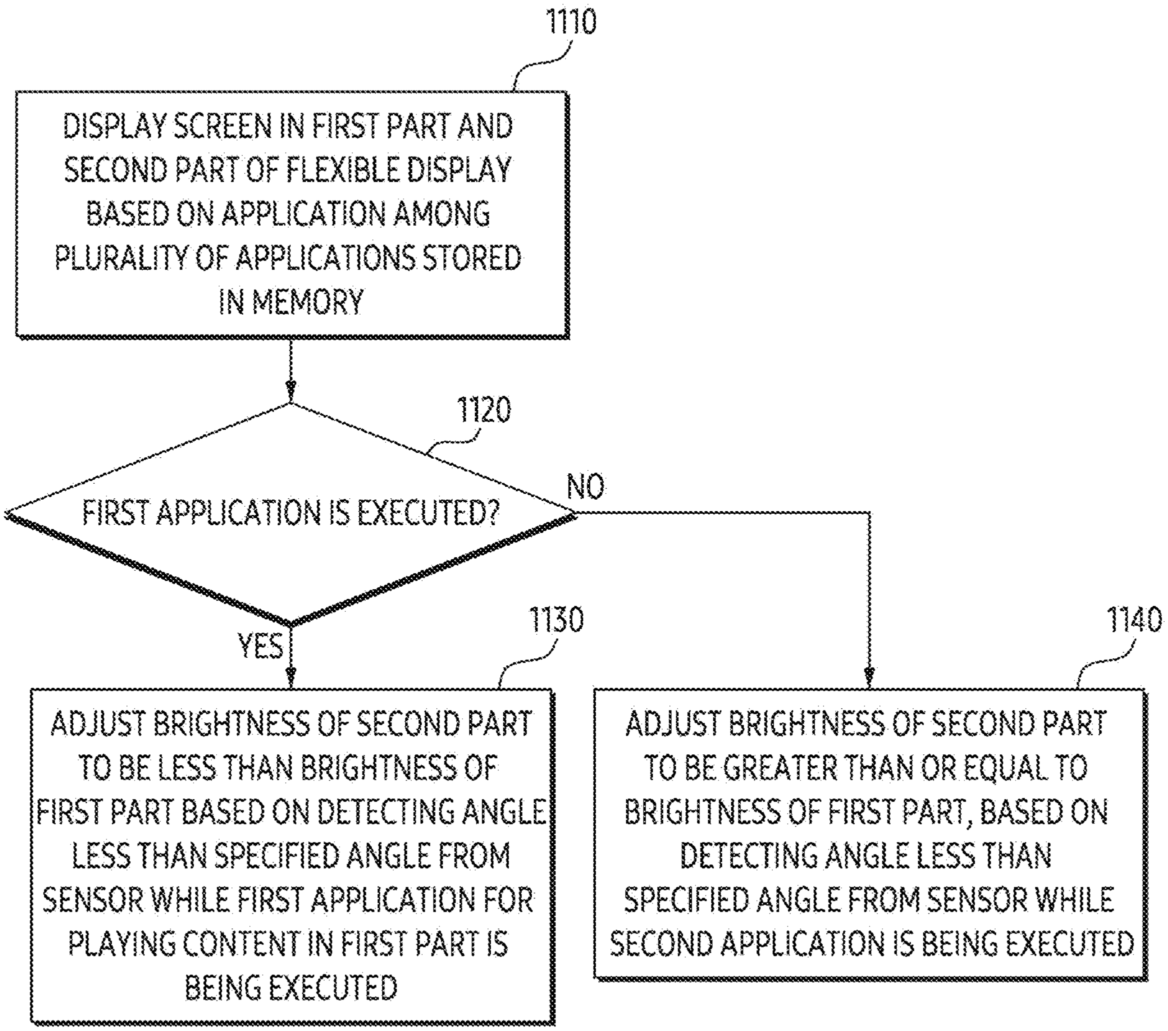
FIG. 11 is a flowchart of an operation in which an electronic device adjusts brightness of a flexible display, based on an application stored in memory according to an embodiment of the disclosure.

FIG. 11 is a flowchart of an operation in which an electronic device adjusts brightness of a flexible display, based on an application stored in memory according to an embodiment of the disclosure.

Referring to FIG. 11, at least one of operations may be performed by the electronic device 101 of FIG. 1 and/or the processor 120 of FIG. 1.

Referring to FIG. 11, in operation 1110, a processor according to an embodiment may display a screen in a first part and a second part of a flexible display based on an application among a plurality of applications stored in memory (e.g., the memory 130 of FIG. 1). The flexible display may be referred to the flexible display 150 of FIG. 1. The first part may be referred to the first part 330 of FIG. 3. The second part may be referred to the second part 331 of FIG. 3. For example, the first part may be a part of the flexible display disposed in a first housing (e.g., the first housing 210 of FIG. 2A), and divided by a folding axis (e.g., the folding axis 237 of FIG. 2A). For example, the second part may be a part different from the part of the flexible display disposed in a second housing (e.g., the second housing 220 of FIG. 2A), and divided by the folding axis.

Referring to FIG. 11, in operation 1120, the processor according to an embodiment may identify whether a first application is executed. For example, the first application may be an example of an application capable of playing the video of FIG. 3.

Referring to FIG. 11, in case that the execution of the first application is identified (operation 1120-Yes), in operation 1130, the processor according to an embodiment may adjust brightness of the second part to be less than brightness of the first part based on detecting an angle less than a specified angle from a sensor while the first application for playing content in the first part is being executed. For example, the sensor may be referred to the sensor 160 of FIG. 1. For example, the angle may be referred to one of the angles 205-2, 205-3, and 205-4 of FIG. 2B. For example, the specified angle may be referenced to one of angles greater than or equal to 0 degree and less than 180 degrees. The content played in the first part may mean the video 315 of FIG. 3. For example, the processor may display a screen (e.g., the screen 326 of FIG. 3) in the second part. For example, the processor may deactivate some of the pixels included in the second part.

Referring to FIG. 11, in case that the execution of the first application is not identified (operation 1120-No), in operation 1140, the processor according to an embodiment may adjust the brightness of the second part to be greater than or equal to the brightness of the first part, based on detecting an angle less than a specified angle from the sensor while a second application is being executed. For example, the second application may be an example of an application displaying a virtual keypad in the first part and/or the second part. For example, while the second application is being executed, the processor may execute an application different from the second application that identifies a part of a user's body parts by using a camera (e.g., the camera 140 of FIG. 1). For example, the different application may be an example of a background application. For example, the processor may adjust the brightness of the second part to be greater than or equal to the brightness of the first part based on identifying the part (e.g., face or eyes) of the user's body parts. For example, the processor may invert and display a color of the virtual keypad displayed in the second part, independently of adjusting the brightness of the second part. The virtual keypad of the inverted color may be referred to the virtual keypad 430-2 of FIG. 4. For example, the processor may adjust the brightness of the second part based on an angle (e.g., the angle 205 of FIG. 2A) between the first housing (e.g., the first housing 210 of FIG. 2A) and the second housing (e.g., the second housing 220 of FIG. 2A) by using the sensor (e.g., the sensor 160 of FIG. 1) independently of the execution of the different application. As described above, the electronic device and/or the processor may improve visibility of the virtual keypad included in the second part based on adjusting the brightness of the second part.

Figure 12:
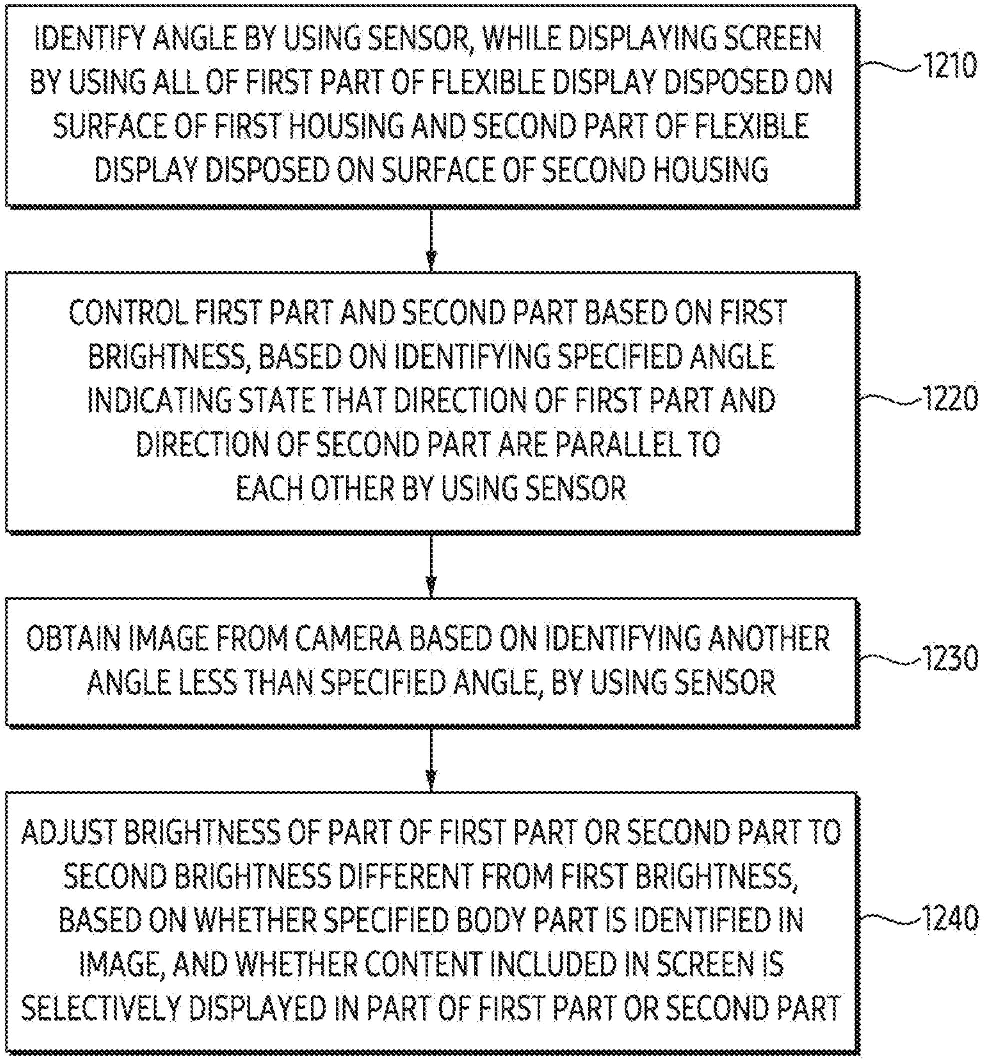
FIG. 12 is a flowchart of an operation in which an electronic device adjusts brightness of a flexible display, based on an image obtained by using a camera according to an embodiment of the disclosure.

FIG. 12 is a flowchart of an operation in which an electronic device adjusts brightness of a flexible display, based on an image obtained by using a camera according to an embodiment of the disclosure.

Referring to FIG. 12, at least one of operations may be performed by the electronic device 101 of FIG. 1 and/or the processor 120 of FIG. 1.

Referring to FIG. 12, in operation 1210, a processor according to an embodiment may identify an angle by using a sensor, while displaying a screen by using all of a first part of a flexible display disposed on a surface of a first housing and a second part of a flexible display disposed on a surface of a second housing. For example, the first housing may be referred to the first housing 210 of FIG. 2A. The second housing may be referred to the second housing 220 of FIG. 2A. The flexible display may be referred to the flexible display 150 of FIG. 1. The first part may be referred to the first part 330 of FIG. 3. The second part may be referred to the second part 331 of FIG. 3. The sensor may be referred to the sensor 160 of FIG. 1. The angle may be an example of an angle (e.g., the angle 205 of FIG. 2A) between the first housing and the second housing. The processor may identify a folding state, a sub-folding state, and/or an unfolding state of the electronic device based on identifying the angle.

Referring to FIG. 12, in operation 1220, the processor according to an embodiment may control the first part and the second part based on first brightness, based on identifying a specified angle indicating a state that a direction of the first part and a direction of the second part are parallel to each other by using the sensor. For example, a state in which the direction of the first part (e.g., the first direction 291 of FIG. 2A) and the direction of the second part (e.g., the second direction 292 of FIG. 2A) are parallel to each other may be referred to the unfolding state. The specified angle may be 180 degrees.

Referring to FIG. 12, in operation 1230, the processor according to an embodiment may obtain an image from a camera based on identifying another angle less than the specified angle, by using the sensor. For example, the other angle may be an example of an angle greater than or equal to 0 degree and less than 180 degrees. The camera may be referred to the camera 140 of FIG. 1. The image may be one of the images 705, 706, and 707 of FIG. 7. An operation of obtaining an image from the camera may be performed by using one of a plurality of applications stored in memory (e.g., the memory 130 of FIG. 1). For example, one of the plurality of applications may be a background application.

Referring to FIG. 12, in operation 1240, the processor according to an embodiment may adjust brightness of a part of the first part or the second part to a second brightness different from the first brightness, based on whether a specified body part is identified in the image, and whether content included in the screen is selectively displayed in the part of the first part or the second part. For example, the specified body part may be at least one of a face or eyes. The processor may selectively display the content included in the screen within the part of the first part or the second part by using the sensor. For example, while playing a video (e.g., the video 315 of FIG. 3), the processor may display a screen (e.g., the screen 316 of FIG. 3) including information different from the video in the second part. For example, while playing the video in the first part, the processor may adjust the brightness of the second part to the second brightness less than the first brightness. For example, while displaying a virtual keypad (e.g., the virtual keypad 430-1 of FIG. 4) in the second part, the processor may display a screen (e.g., the screen 431 of FIG. 4) including text received by using the virtual keypad in the first part. For example, the processor may adjust the brightness of the second part to a second brightness greater than or equal to the first brightness.

As described above, the electronic device and/or the processor of the electronic device may decrease the brightness of the second part so that the screen displayed in the second part is not reflected on the first part while playing the video in the first part. For example, the electronic device and/or the processor of the electronic device may adjust the brightness of the second part so that a plurality of icons included in the virtual keypad may be distinguished respectively while displaying the virtual keypad in the second part based on an application. The electronic device may provide readability with respect to the virtual keypad based on the adjusted brightness of the second part.

Figure 13:
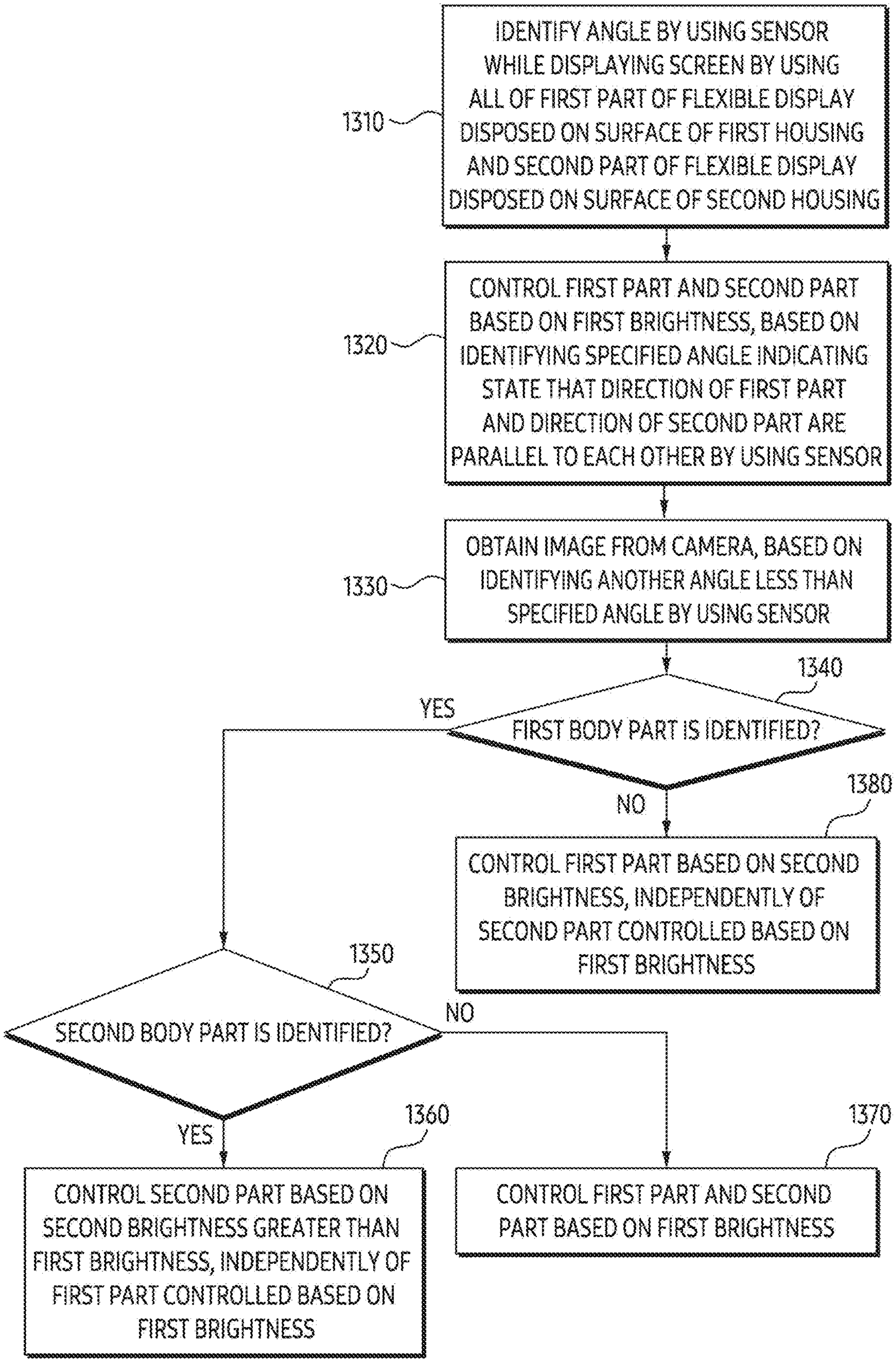
FIG. 13 is a flowchart of an operation in which an electronic device adjusts brightness of a flexible display, based on a state identified by using a camera according to an embodiment of the disclosure.

FIG. 13 is a flowchart of an operation in which an electronic device adjusts brightness of a flexible display, based on a state identified by using a camera according to an embodiment of the disclosure.

Referring to FIG. 13, at least one of operations may be performed by the electronic device 101 of FIG. 1 and/or the processor 120 of FIG. 1.

Referring to FIG. 13, in operation 1310, a processor according to an embodiment may identify an angle by using a sensor while displaying a screen by using all of a first part of a flexible display disposed on a surface of a first housing and a second part of a flexible display disposed on a surface of a second housing. For example, the processor may perform the operation 1310 substantially similar to the operation 1210 of FIG. 12.

Referring to FIG. 13, in operation 1320, the processor according to an embodiment may control the first part and the second part based on a first brightness, based on identifying a specified angle indicating a state that a direction of the first part and a direction of the second part are parallel to each other by using the sensor. For example, the processor may perform the operation 1320, substantially similar to the operation 1220 of FIG. 12.

Referring to FIG. 13, in operation 1330, the processor according to an embodiment may obtain an image from a camera, based on identifying another angle less than the specified angle by using the sensor. For example, the processor may perform the operation 1330, substantially similar to the operation 1230 of FIG. 12.

Referring to FIG. 13, in operation 1340, the processor according to an embodiment may determine whether to identify a first body part. For example, the first body part (e.g., face of a user) may be included in the image obtained in the operation 1330. The processor may identify the first body part (e.g., the first body part 711 of FIG. 7) in the obtained image (e.g., the image 705 of FIG. 7).

Referring to FIG. 13, in case of identifying the first body part (the operation 1340-Yes), in operation 1350, the processor according to an embodiment may determine whether to identify a second body part. For example, the second body part (e.g., eyes of the user) may be included in the image obtained in the operation 1330. The processor may identify the second body part (e.g., the second body part 712 of FIG. 7).

Referring to FIG. 13, in case of identifying the second body part (the operation 1350-Yes), in operation 1360, the processor according to an embodiment may control the second part based on second brightness greater than the first brightness, independently of the first part controlled based on the first brightness. For example, a state in which the processor identifies the first body part and the second body part may be referred to the state 710 of FIG. 7. The processor may compensate for a brightness deviation of the first part and the second part, based on controlling the second part based on the second brightness greater than the first brightness.

Referring to FIG. 13, in case of not identifying the second body part (the operation 1350-No), in operation 1370, the processor according to an embodiment may control the first part and the second part based on the first brightness. For example, a second state may be referred to the state 620 of FIG. 6. For example, while the processor identifies the first body part, a state of not identifying the second body part may be referred to the state 720 of FIG. 7. The processor may maintain the brightness of the first part and the brightness of the second part in the second state.

Referring to FIG. 13, in case of not identifying the first body part (the operation 1340-No), in operation 1380, the processor according to an embodiment may control the first part based on the second brightness, independently of the second part controlled based on the first brightness. For example, a state in which the processor does not identify all of the first body part and the second body part may be referred to the state 730 of FIG. 7. For example, the processor may compensate for the brightness deviation of the first part and the second part, based on controlling the first part by using the second brightness greater than the first brightness.

As described above, the electronic device (e.g., the electronic device 101 of FIG. 1) may identify a part among the body part (e.g., the first body part 711 or the second body part 712 of FIG. 7) of the user of the electronic device by using at least one camera (e.g., the camera 140 of FIG. 1). The electronic device may obtain a viewing angle based on the identified part. The electronic device may control brightness of a part of the flexible display (e.g., the flexible display 150 of FIG. 1) based on the obtained viewing angle. For example, the electronic device may identify an angle between the first housing (e.g., the first housing 210 of FIG. 2A) and the second housing (e.g., the second housing 220 of FIG. 2A) by using at least one sensor (e.g., the sensor 160 of FIG. 1). The electronic device may adjust the brightness of the part of the flexible display, based on the identified angle. For example, the user of the electronic device may secure visibility with respect to the part of the flexible display based on the adjusted brightness.

For example, the electronic device may adjust the brightness of the part of the flexible display based on one of a plurality of applications stored in memory. The electronic device may adjust the brightness of the part of the flexible display by using one of the sensor or the camera in a folding state.

As described above, an electronic device (e.g., the electronic device 101 of FIG. 1) according to an embodiment may comprise a first housing (e.g., the first housing 210 of FIG. 2A), a second housing (e.g., the second housing 220 of FIG. 2A), a hinge structure (e.g., the folding housing 265 of FIG. 2B) rotatably coupling the second housing to the first housing, a flexible display (e.g., the flexible display 150 of FIG. 1) disposed across the hinge structure on a surface (e.g., the first surface 211 of FIG. 2A) of the first housing and a surface (e.g., the second surface 221 of FIG. 2A) of the second housing, memory (the flexible display 130 of FIG. 1), a sensor (e.g., the sensor 160 of FIG. 1) for detecting an angle between the first housing and the second housing, and at least one processor (e.g., the processor 120 of FIG. 1) operably coupled to the flexible display, the memory, and the sensor. The at least one processor may be configured to display a screen within a first part (e.g., the first part 330 of FIG. 3) and a second part (e.g., the second part 331 of FIG. 3) of the flexible display, which are separated by the hinge structure, based on an application among a plurality of applications stored in the memory. The at least one processor may be configured to, based on detecting the angle less than a specified angle from the sensor, while a first application for playing a content within the first part among the plurality of applications is executed, adjust brightness of the second part less than brightness of the first part in which the content is being played.

For example, the screen may be a first screen. The at least one processor may be configured to, while playing a video (e.g., the video 315 of FIG. 3) included in the content within the first part based on the first application, and while displaying a second screen (e.g., the screen 316 of FIG. 3) including information different from the video within the second part, display, independently of adjusting the brightness of the second part, a third screen (e.g., the screen 326) by overlapping the second screen.

For example, the at least one processor may be configured to receive at least one input via the second part on which the third screen is displayed. The at least one processor may be configured to deactivate the display of the third screen for a specified time period based on receiving the at least one input.

For example, the at least one processor may be configured to, using a sensor different from the sensor, identify whether to play the video within a part of the first part or the second part. The at least one processor may be configured to, based on the identification, play the video within the part. The at least one processor may be configured to display the second screen in another part different from the part.

For example, the video may be a first video. The second screen may include a first list of videos distinct from the first video played within the first part. The at least one processor may be configured to receive an input for selecting one among the first list of different videos. The at least one processor may be configured to play a second video corresponding to the received input within the first part based on the received input. The at least one processor may be configured to display a third screen including a second list different from the first list within the second part.

For example, the at least one processor may be configured to, based on detecting the angle less than the specified angle from the sensor, while a second application different from the first application among the plurality of applications is executed, adjust the brightness of the second part equal to or greater than the brightness of the first part. The at least one processor may be configured to, while the second application is executed, based on the brightness of the first part, adjust the brightness of the second part to compensate for a relative brightness deviation.

For example, the at least one processor may be configured to invert color of the second part independently of adjusting the brightness of the second part.

For example, the at least one processor may be configured to, based on the second application, display a virtual keypad (e.g., the virtual keypad 430-1 of FIG. 4) for receiving text within the second part. The at least one processor may be configured to, based on an input received through the displayed virtual keypad, display text based on the input within the first part.

For example, the at least one processor may be configured to identify the angle from the sensor while the second application is executed. The at least one processor may be configured to adjust at least one of the brightness of the first part or the brightness of the second part based on the identified angle.

For example, the electronic device may include a first display driver IC (DDI) for controlling first pixels included in the first part and a second DDI for controlling second pixels included in the second part. The at least one processor may be configured to display a fifth screen (e.g., the screen 901 of FIG. 9) within the first part and the second part. The at least one processor may be configured to adjust brightness of at least one of the first part or the second part based on the fifth screen.

As described above, an electronic device (e.g., the electronic device 101 of FIG. 1) according to an embodiment may comprise a first housing (e.g., the first housing 210 of FIG. 2A), a second housing (e.g., the second housing 220 of FIG. 2A), a hinge structure (e.g., the folding housing 265 of FIG. 2B) rotatably coupling the second housing to the first housing, a flexible display (e.g., the flexible display 150 of FIG. 1) disposed across the hinge structure on a surface (e.g., the first surface 211 of FIG. 2A) of the first housing and a surface (e.g., the second surface 221 of FIG. 2A) of the second housing, a camera (e.g., the camera 140 of FIG. 1) exposed to the outside from the surface of the first housing on which the flexible display is disposed, memory (e.g., the memory 130 of the FIG. 1), a sensor (e.g., the sensor 160 of FIG. 1) for detecting an angle between the first housing and the second housing, and at least one processor (e.g., the processor 120 of FIG. 1) operably coupled to the flexible display, the memory, and the sensor. The at least one processor may be configured to identify the angle by using the sensor, while displaying a screen using all of a first part (e.g., the first part 330 of FIG. 3) of the flexible display disposed on the surface of the first housing and a second part (e.g., the second part 331 of FIG. 3) of the flexible display disposed on the surface of the second housing. The at least one processor may be configured to, based on identifying a specified angle indicating a state that a direction of the first part and a direction of the second part are parallel each other, control the first part and the second part based on first brightness by using the sensor. The at least one processor may be configured to, based on identifying another angle less than the specified angle, obtain an image (e.g., the image 705 of FIG. 7) from the camera by using the sensor. The at least one processor may be configured to, based on whether a specified body part (e.g., the first body part 711 of FIG. 7 or the second body part 712 of FIG. 7) is identified within the image, and whether content included in the screen is selectively displayed within a part of the first part or the second part, adjust brightness of the part of the first part or the second part to second brightness different from the first brightness.

For example, the screen may be a first screen. The at least one processor may be configured to, while playing a video (e.g., the video 315 of FIG. 3) included in the content within the first part based on a first application stored within the memory, and while displaying a second screen (e.g., the screen 316 of FIG. 3) including information different from the video within the second part, control, independently of the first part controlled based on the first brightness, the second part based on the second brightness less than the first brightness. The at least one processor may be configured to, while playing the video within the second part, and while displaying the second screen within the first part, control, independently of the second part controlled based on the first brightness, the first part based on the second brightness.

For example, the at least one processor may be configured to, while displaying the information within the part of the first part or the second part, display, independently of the part controlled based on the second brightness, a third screen (e.g., the screen 326 of FIG. 3) by overlapping the second screen.

For example, the at least one processor may be configured to, within the part of the first part or the second part, receive at least one input via the part on which the third screen is displayed. The at least one processor may be configured to deactivate the display of the third screen for a specified time period within the part, based on receiving the at least one input.

For example, the at least one processor may be configured to may identify one of the first part or the second part having a direction different from a direction of the first part and a direction of the second part. The at least one processor may play the video in the identified part.

For example, the at least one processor may be configured to, within a first state in which all of the specified body parts are identified in the image, control the second part based on third brightness greater than the first brightness, independently of the first part controlled based on the first brightness, based on a second application different from the first application stored in the memory. The at least one processor may be configured to, within a second state in which a part of the specified body part is identified in the image, control the first part and the second part based on the first brightness. The at least one processor may be configured to, within a third state different from the first state and the second state in the image, control the first part based on the third brightness, independently of the second part controlled based on the first brightness.

For example, the at least one processor may be configured to, within the first state, based on the first brightness of the first part, adjust the third brightness of the second part in order to compensate for a relative brightness deviation. The at least one processor may be configured to, within the third state, based on the first brightness of the second part, adjust the third brightness of the first part in order to compensate for the relative brightness deviation.

For example, the at least one processor may be configured to, based on the first application, within the first state and the second state, play the video, within the first part. The at least one processor may be configured to, based on identifying the third state, play the video by replacing the second screen, within the second part.

For example, the at least one processor may be configured to display a fourth screen including a virtual keypad (e.g., the virtual keypad 430-1 of FIG. 4) for receiving text in the second part.

For example, the at least one processor may be configured to display the virtual keypad within the fourth screen based on invert color, independently of controlling the second part within the first state based on the third brightness.

As described above, an electronic device (e.g., the electronic device 101 of FIG. 1) according to an embodiment may comprise a first housing (e.g., the first housing 210 of FIG. 2A), a second housing (e.g., the second housing 220 of FIG. 2A), a hinge structure (e.g., the folding housing 265 of FIG. 2B) rotatably coupling the second housing to the first housing, a flexible display (e.g., the flexible display 150 of FIG. 1) disposed across the hinge structure on a surface (e.g., the first surface 211 of FIG. 2A) of the first housing and a surface (e.g., the second surface 221 of FIG. 2A) of the second housing, a camera (e.g., the camera 140 of FIG. 1) exposed to the outside from the surface of the first housing on which the flexible display is disposed, memory (e.g., the memory 130 of FIG. 1), a sensor (e.g., the sensor 160 of FIG. 1) for detecting an angle between the first housing and the second housing, and at least one processor (e.g., the processor 120 of FIG. 1) operably coupled to the flexible display, the memory, and the sensor. The at least one processor may be configured to identify the angle by using the sensor, while displaying a screen using all of a first part of the flexible display disposed on the surface of the first housing and a second part of the flexible display disposed on the surface of the second housing. The at least one processor may be configured to, based on identifying a specified angle indicating a state that a direction of the first part and a direction of the second part are parallel each other, control the first part and the second part based on first brightness by using the sensor. The at least one processor may be configured to, based on identifying another angle less than the specified angle, obtain an image from the camera by using the sensor. The at least one processor may be configured to, within a first state (e.g., the state 710 of FIG. 7) in which all of a first body part (e.g., the first body part 711 of FIG. 7) and a second body part (e.g., the second body part 712 of FIG. 7) included in the first body part are identified in the image, control the second part based on second brightness greater than the first brightness, independently of the first part controlled based on the first brightness. The at least one processor may be configured to, within a second state (e.g., the state 720 of FIG. 7) in which the first body part is identified independently of the second body part in the image, control the first part and the second part based on the first brightness. The at least one processor may be configured to, within a third state (e.g., the state 730 of FIG. 7) different from the first state and the second state, control the first part based on the second brightness, independently of the second part controlled based on the first brightness.

For example, the screen may be a first screen. The at least one processor may be configured to, while playing a video (e.g., the video 315 of FIG. 3) included in content within the first part based on a first application stored within the memory, and while displaying a second screen (e.g., the screen 316 of FIG. 3) including information different from the video within the second part, control, independently of the first part controlled based on the first brightness, the second part based on the second brightness less than the first brightness. The at least one processor may be configured to, while playing the video within the second part, and while displaying the second screen within the first part, control, independently of the second part controlled based on the first brightness, the first part based on the second brightness.

For example, the at least one processor may be configured to, using the sensor, identify a part of the first part or the second part, which has a direction different from a direction of the first part and a direction of the second part. The at least one processor may be configured to play the video within the identified part.

For example, the at least one processor may be configured to, while displaying the second screen within the part of the first part or the second part, display, independently of the part controlled based on the second brightness, a third screen by overlapping the second screen.

For example, the at least one processor may be configured to, while displaying the third screen by overlapping the second screen within the part of the first part or the second part, receive at least one input via the part on which the third screen is displayed. The at least one processor may be configured to deactivate the display of the third screen for a specified time period within the part, based on receiving the at least one input.

As described above, a method of an electronic device (e.g., the electronic device 101 of FIG. 1) according to an embodiment may comprise identifying an angle by using a sensor (e.g., the sensor 160 of FIG. 1), while displaying a screen using all of a first part (e.g., the first part 330 of FIG. 3) of a flexible display (e.g., the flexible display 150 of FIG. 1) disposed on a surface (e.g., the first surface 211 of FIG. 2A) of a first housing (e.g., the first housing 210 of FIG. 2A), and a second part (e.g., the second part 331 of FIG. 3) of the flexible display disposed on a surface (e.g., the second surface 221 of FIG. 2A) of a second housing (e.g., the second housing 220 of FIG. 2A). The method of the electronic device may comprise, based on identifying a specified angle indicating a state that a direction of the first part and a direction of the second part are parallel each other, controlling the first part and the second part based on first brightness by using the sensor. It may comprise, based on identifying another angle less than the specified angle, obtaining an image from a camera (e.g., the camera 140 of FIG. 1) by using the sensor. The method of the electronic device may comprise, within a first state (e.g., the state 710 of FIG. 7) in which all of a first body part (e.g., the first body part 711 of FIG. 7) and a second body part (e.g., the second body part 712 of FIG. 7) included in the first body part are identified in the image, controlling the second part based on second brightness greater than the first brightness, independently of the first part controlled based on the first brightness. The method of the electronic device may comprise, within a second state (e.g., the state 720 of FIG. 7) in which the first body part is identified independently of the second body part in the image, controlling the first part and the second part based on the first brightness. The method of the electronic device may comprise, within a third state (e.g., the state 730 of FIG. 7) different from the first state and the second state, controlling the first part based on the second brightness, independently of the second part controlled based on the first brightness.

For example, the screen may be a first screen. The method of the electronic device may comprise, while playing a video (e.g., the video 315 of FIG. 3) included in the content within the first part based on a first application stored within memory, and while displaying a second screen (e.g., the screen 316 of FIG. 3) including information different from the video within the second part, controlling, independently of the first part controlled based on the first brightness, the second part based on the second brightness less than the first brightness. The method of the electronic device may comprise, while playing the video within the second part, and while displaying the second screen within the first part, controlling, independently of the second part controlled based on the first brightness, the first part based on the second brightness.

For example, the method of the electronic device may comprise, using the sensor, identifying a part of the first part or the second part, which has a direction different from the direction of the first part and the direction of the second part. The method of the electronic device may comprise playing the video within the identified part.

For example, the method of the electronic device may comprise, while displaying the second screen within the part of the first part or the second part, displaying, independently of the part controlled based on the second brightness, a third screen (e.g., the screen 326 of FIG. 3) by overlapping the second screen.

For example, the method of the electronic device may comprise, while displaying the third screen by overlapping the second screen within the part of the first part or the second part, receiving at least one input via the part on which the third screen is displayed. The method of the electronic device may comprise deactivating the display of the third screen for a specified time period within the part, based on receiving the at least one input.

As described above, a method of an electronic device (e.g., the electronic device 101 of FIG. 1) according to an embodiment may comprise identifying an angle by using a sensor (e.g., the sensor 160 of FIG. 1), while displaying a screen using all of a first part (e.g., the first part 330 of FIG. 3) of a flexible display (e.g., the flexible display 150 of FIG. 1) disposed on a surface (e.g., the first surface 211 of FIG. 2A) of a first housing (e.g., the first housing 210 of FIG. 2A), and a second part (e.g., the second part 331 of FIG. 3) of the flexible display disposed on a surface (e.g., the second surface 221 of FIG. 2A) of a second housing (e.g., the second housing 220 of FIG. 2A). The method of the electronic device may comprise, based on identifying a specified angle indicating a state that a direction of the first part and a direction of the second part are parallel each other, controlling the first part and the second part based on first brightness by using the sensor. The method of the electronic device may comprise, based on identifying another angle less than the specified angle, obtaining an image from a camera (e.g., the camera 140 of FIG. 1) by using the sensor. The method of the electronic device may comprise, based on whether a specified body part is identified within the image, and whether content included in the screen is selectively displayed within a part of the first part or the second part, adjusting brightness of a part of the first part or the second part to second brightness different from the first brightness.

For example, the screen may be a first screen. The method of the electronic device may comprise, while playing a video (e.g., the video 315 of FIG. 3) included in the content within the first part based on a first application stored within memory (e.g., the memory 130 of FIG. 1), and while displaying a second screen (e.g., the screen 316 of FIG. 3) including information different from the video within the second part, controlling, independently of the first part controlled based on the first brightness, the second part based on the second brightness less than the first brightness. The method of the electronic device may comprise, while playing the video within the second part, and while displaying the second screen within the first part, controlling, independently of the second part controlled based on the first brightness, the first part based on the second brightness.

For example, it may comprise, while displaying the information within the part of the first part or the second part, displaying, independently of the part controlled based on the second brightness, a third screen (e.g., the screen 326 of FIG. 3) by overlapping the second screen.

For example, it may comprise, within the part of the first part or the second part, receiving at least one input via the part on which the third screen is displayed. The method of the electronic device may comprise deactivating the display of the third screen for a specified time period within the part, based on receiving the at least one input.

For example, it may comprise, using the sensor, identifying a part of the first part or the second part, which has a direction different from the direction of the first part and the direction of the second part. The method of the electronic device may comprise playing the video within the identified part.

As described above, a method of an electronic device (e.g., the electronic device 101 of FIG. 1) according to an embodiment may comprise displaying a screen within a first part (e.g., the first part 330 of FIG. 3) and a second part (e.g., the second part 331 of FIG. 3) of a flexible display (e.g., the flexible display 150 of FIG. 1), which are separated by a hinge structure (e.g., the folding housing 265 of FIG. 2B), based on an application among a plurality of applications stored in memory (e.g., the memory 130 of FIG. 1). The method of the electronic device may comprise, based on detecting an angle less than a specified angle from a sensor, while a first application for playing content within the first part among the plurality of applications is executed, adjusting brightness of the second part less than brightness of the first part in which the content is being played.

For example, the screen may be a first screen. The method of the electronic device may comprise, while playing a video (e.g., the video 315 of FIG. 3) included in the content within the first part based on the first application, and while displaying a second screen including information different from the video within the second part, independently of adjusting the brightness of the second part, displaying a third screen by overlapping the second screen.

For example, the method of the electronic device may comprise receiving at least one input via the second part on which the third screen is displayed. The method of the electronic device may comprise deactivating the display of the third screen for a specified time period, based on receiving the at least one input.

For example, the method of the electronic device may comprise, based on detecting the angle less than the specified angle from the sensor, while a second application different from the first application among the plurality of applications is executed, adjusting the brightness of the second part greater than or equal to the brightness of the first part. The method of the electronic device may comprise, while the second application is executed, based on the brightness of the first part, adjusting the brightness of the second part, in order to compensate for a relative brightness deviation.

For example, the method of the electronic device may comprise inverting color of the second part independently of adjusting the brightness of the second part.

For example, the electronic device may adjust the brightness of a part of the flexible display based on one of the plurality of applications stored in the memory. The electronic device may adjust the brightness of the part of the flexible display by using one of a sensor or a camera in a folding state.

The electronic device according to various embodiments may be one of various types of electronic devices. The electronic devices may include, for example, a portable communication device (e.g., a smartphone), a computer device, a portable multimedia device, a portable medical device, a camera, an electronic device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device individually or collectively, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

No claim element is to be construed under the provisions of 35 U.S.C. § 112, sixth paragraph, unless the element is expressly recited using the phrase "means for" or "means".

What is claimed is:

1. An electronic device comprising:

a first housing part;

a second housing part rotatably coupled to the first housing part;

a flexible display including a portion to be bent inward such that a first display portion disposed on the first housing part and a second display portion disposed on the second housing part face each other, when the second housing part is folded with respect to the first housing part;

a camera;

memory storing one or more computer programs;

a first sensor; and one or more processors including processing circuitry, wherein the one or more computer programs include computer-executable instructions that, when executed by the one or more processors individually or collectively, cause the electronic device to:

identify, using the first sensor, a state of the electronic device, obtain an image using the camera, based on a state of the electronic device being identified as an unfolded state where the first housing part and the second housing part are unfolded with respect to each other, display, via the flexible display, a screen of which a first screen portion is displayed via first display portion and a second screen portion is displayed via second display portion, based on a state of the electronic device being identified as changing from the unfolded state to a partially folded state while the screen is displayed, and a defined body part of a user being identified based on the image, adjust a relative brightness between the first screen portion and the second screen portion such that brightness of the first screen portion is darker than brightness of the second screen portion, and based on a state of the electronic device being identified as changing from the unfolded state to the partially folded state and another body part of the user different from the defined body part being identified based on the image, adjust the relative brightness such that brightness of the second screen portion is darker than brightness of the first screen portion, and wherein the partially folded state is a state between the unfolded state and a folded state where the first housing part and the second housing part are folded with respect to each other.

2. The electronic device of claim 1, wherein the one or more computer programs further include computer-executable instructions that, when executed by the one or more processors individually or collectively, cause the electronic device to:

while displaying the screen including a first content on the first screen portion and a second content on the second screen portion, reduce the brightness of the second screen portion display by overlapping a layer having specified opacity on the second screen portion.

3. The electronic device of claim 2, wherein the one or more computer programs further include computer-executable instructions that, when executed by the one or more processors individually or collectively, cause the electronic device to:

receive at least one input via the second screen portion on which the layer is overlapped; and based on receiving the at least one input, cease overlapping the layer for a specified time period.

4. The electronic device of claim 1, wherein the one or more computer programs further include computer-executable instructions that, when executed by the one or more processors individually or collectively, cause the electronic device to:

identify, using the camera, a viewing angle of a user, and based on the viewing angle, adjust a relative brightness between the first screen portion and the second screen portion.

5. The electronic device of claim 1, wherein the one or more computer programs further include computer-executable instructions that, when executed by the one or more processors individually or collectively, cause the electronic device to:

invert color of the second screen portion independently of adjusting the brightness of the second screen portion.

6. The electronic device of claim 1, wherein the brightness of the first screen portion is maintained before and after changing from the unfolded state to the partially folded state.

7. The electronic device of claim 1, wherein the one or more computer programs further include computer-executable instructions that, when executed by the one or more processors individually or collectively, cause the electronic device to:

display a list of a plurality of videos on the second screen portion; and in response to a user input for selecting a video from the list, display the video on the first screen portion.

8. The electronic device of claim 1 including:

a first display driver IC (DDI) for controlling first pixels included in the first display portion; and a second DDI for controlling second pixels included in the second display portion.

9. A method performed by an electronic device including a first housing part, a second housing part rotatably couped to the first housing part, and a flexible display including a portion to be bent inward such that a first display portion disposed on the first housing part and a second display portion disposed on the second housing part face each other, when the second housing part is folded with respect to the first housing part, the method comprising:

identifying, using a first sensor, a state of the electronic device, obtaining an image using a camera, based on a state of the electronic device being identified as an unfolded state where the first housing part and the second housing part are folded with respect to each other, displaying, via the flexible display, a screen of which a first screen portion is displayed via first display portion and a second screen portion is displayed via second display portion, based on a state of the electronic device being identified as changing from the unfolded state to a partially folded state while the screen is displayed, and a defined body part of a user being identified based on the image, adjusting a relative brightness between the first screen portion and the second screen portion such that brightness of the first screen portion is darker than brightness of the second screen portion, and based on a state of the electronic device being identified as changing from the unfolded state to the partially folded state and another body part of the user different from the defined body part being identified based on the image, adjusting the relative brightness such that brightness of the second screen portion is darker than brightness of the first screen portion, and wherein the partially folded state is a state between the unfolded state and a folded state where the first housing part and the second housing part are folded with respect to each other.

10. The method of claim 9, comprising:

while displaying the screen including a first content on the first screen portion and a second content on the second screen portion, reducing the brightness of the second screen portion display by overlapping a layer having specified opacity on the second screen portion.

11. The method of claim 10, further comprising:

receiving at least one input via the second screen portion on which the layer is overlapped; and based on receiving the at least one input, ceasing overlapping the layer for a specified time period.

12. The method of claim 9, further comprising:

identifying, using the camera, a viewing angle of a user, and based on the viewing angle, adjusting a relative brightness between the first screen portion and the second screen portion.

13. The method of claim 9, comprising:

inverting color of the second screen portion independently of adjusting the brightness of the second screen portion.

14. The method of claim 9, wherein the brightness of the first screen portion is maintained before and after changing from the unfolded state to the partially folded state.

15. One or more non-transitory computer-readable storage media storing one or more computer programs including computer-executable instructions that, when executed by one or more processors of an electronic device including a first housing part, a second housing part rotatably couped to the first housing part, and a flexible display including a portion to be bent inward such that a first display portion disposed on the first housing part and a second display portion disposed on the second housing part face each other, when the second housing part is folded with respect to the first housing part, individually or collectively, cause the electronic device to perform operations, the operations comprising:

identifying, using a first sensor, a state of the electronic device, obtaining an image using a camera, based on a state of the electronic device being identified as an unfolded state where the first housing part and the second housing part are folded with respect to each other, displaying, via the flexible display, a screen of which a first screen portion is displayed via first display portion and a second screen portion is displayed via second display portion, based on a state of the electronic device being identified as changing from the unfolded state to a partially folded state while the screen is displayed, and a defined body part of a user being identified based on the image, adjusting a relative brightness between the first screen portion and the second screen portion such that brightness of the first screen portion is darker than brightness of the second screen portion, and based on a state of the electronic device being identified as changing from the unfolded state to the partially folded state and another body part of the user different from the defined body part being identified based on the image, adjusting the relative brightness such that brightness of the second screen portion is darker than brightness of the first screen portion, and wherein the partially folded state is a state between the unfolded state and a folded state where the first housing part and the second housing part are folded with respect to each other.

16. The one or more non-transitory computer-readable storage media of claim 15, wherein the operations further comprise:

while displaying the screen including a first content on the first screen portion and a second content on the second screen portion, reducing the brightness of the second screen portion display by overlapping a layer having specified opacity on the second screen portion.

* * * * *